United States Patent [19]
Ikeda et al.

[11] Patent Number: 5,974,044
[45] Date of Patent: Oct. 26, 1999

[54] SYSTEM AND METHOD FOR CONTROLLING VOICE AND DATA COMMUNICATIONS

[75] Inventors: Kimio Ikeda, Warabi; Koji Sasada, Tokyo; Akitoshi Miyazaki, Tokorozawa; Kazuo Sugiyama, Kashiwa; Akihiro Maebara, Yokohama; Ichiro Okajima, Yokohama; Noriko Uchida, Yokohama, all of Japan

[73] Assignee: Mobile Communications Network Inc., Tokyo, Japan

[21] Appl. No.: 08/635,923

[22] PCT Filed: Dec. 28, 1995

[86] PCT No.: PCT/JP95/02755

§ 371 Date: Apr. 26, 1996

§ 102(e) Date: Apr. 26, 1996

[87] PCT Pub. No.: WO96/21308

PCT Pub. Date: Jul. 11, 1996

[30] Foreign Application Priority Data

Jan. 5, 1995 [JP] Japan .................................. 7-000395
Jan. 5, 1995 [JP] Japan .................................. 7-000396

[51] Int. Cl.$^6$ .................................................. H04J 3/17
[52] U.S. Cl. ......................... 370/354; 370/381; 370/462
[58] Field of Search .................................. 370/329, 336, 370/337, 345, 352, 354, 381, 462, 493, 494, 495, 382, 383; 455/556, 557, 426

[56] References Cited

U.S. PATENT DOCUMENTS

| | | | |
|---|---|---|---|
| 5,428,608 | 6/1995 | Freeman et al. | 370/261 |
| 5,459,775 | 10/1995 | Isono et al. | |
| 5,513,251 | 4/1996 | Rochkind et al. | 379/93.35 |
| 5,528,664 | 6/1996 | Slekys et al. | 455/452 |
| 5,544,164 | 8/1996 | Baran | 370/397 |
| 5,574,773 | 11/1996 | Grob et al. | 455/466 |
| 5,590,406 | 12/1996 | Bayley et al. | 455/557 |
| 5,619,508 | 4/1997 | Davis et al. | 370/495 |

FOREIGN PATENT DOCUMENTS

| | | |
|---|---|---|
| 0399520 | 11/1990 | European Pat. Off. . |
| 0592963 | 4/1994 | European Pat. Off. . |
| 06037929 | 2/1994 | Japan . |
| 95/02755 | 12/1995 | WIPO . |

*Primary Examiner*—Min Jung
*Attorney, Agent, or Firm*—Brinks Hofer Gilson & Lione

[57] ABSTRACT

This invention appropriately regulates or controls a simultaneous communication between different communication methods. When a request of a voice communication is made with respect to a communication terminal 4 which is currently busy with a packet communication from a communication terminal 1, a voice incoming signal is generated at a voice line controller 20. Then, a communication terminal state request is output from the voice line controller 20. This is transmitted to a data base 30 through a data exchange device 21. Then, the data base 30 reads voice line memory AB, packet line memory PB and transmits the same as a communication terminal state response to the voice line controller 20 through the data exchange device 21. As a consequence, the voice line controller 20 can know the communication state of the communication terminal 4 and determines whether or not the voice communication circuit should be connected based on it.

25 Claims, 12 Drawing Sheets

SYSTEM AND METHOD FOR CONTROLLING VOICE AND DATA COMMUNICATIONS

TECHNICAL FIELD

This invention relates to a communication switching system and a communication switching method for regulating or controlling a simultaneous communication when communications by multiple communication methods are competed with each other.

BACKGROUND ART

Heretofore, a communication method available in a mobile communication is limited to a voice communication method. In such a voice communication method, there are provided line memory in a data base for controlling users' location information, so that a simultaneous communication (competition) can be regulated depending on "idle" or "busy" which the line memory indicates. In case the line memory indicates "idle", the receiver side is in a non-use state and therefore a communication is allowed. However, in case the line memory indicates "busy", the receiver side is in a used-state, therefore a communication is not allowed and busy tone is sent to the transmitter side, informing that the line is busy.

Incidentally, there is an increasing need for data communication as the recent information-oriented society develops. Specifically, there is a requirement for employing a packet communication as one method of data communication in the mobile communication.

However, it is only a simultaneous communication between voice communications which has heretofore been regulated. Accordingly, it was impossible to regulate a simultaneous communication between a voice communication and a packet communication. Also, it was impossible for the communication switching system to inform, through a communication method by which another communication is undergoing, the transmitter side about a fact that the incoming communication is regulated.

DISCLOSURE OF INVENTION

This invention has been accomplished in view of the above-mentioned situation. It is, therefore, a main object of the present invention to perform a correct processing by regulating or controlling a simultaneous communication between different communication methods such a simultaneous communication between a packet communication and a voice communication and to notify, where it is the case, the transmitter side about a fact that an incoming communication is regulated, through a communication method which is currently busy with another communication.

In order to achieve the above object, according to the invention as defined in claim 1, there is provided a communication switching system for controlling communications that are performed through multiple communication methods by connecting and switching communication circuits between individual communication terminals, comprising a data base for managing a line memory indicating a communication state of the communication terminal for every one of the communication methods; read means for reading a line memory relevant to one communication terminal from the data base when a communication request is made with respect to the one communication terminal from other communication terminal through one communication method; and judgment means for checking whether or not the one communication terminal is currently busy in accordance with the line memory relevant to the one communication terminal and if busy, by what communication method and judging whether or not the communication request should be allowed.

Further, according to the invention as defined in claim 2, the communication switching system further comprises circuit connection means for connecting a communication circuit between the one and other communication terminals when the judgment result is affirmative; and announcement information transmission means for transmitting an announcement information to the other communication terminal when the judgement result is negative, informing that the one communication terminal is currently busy.

Further, according to the invention as defined in claim 3, the announcement information is transmitted by the one communication method through which the communication request was made.

Further, according to the invention as defined in claim 4, there is provided a communication switching method for controlling communications that are performed through multiple communication methods by connecting and switching communication circuits between individual communication terminals, comprising detecting a communication state of the communication terminal and writing line memory indicating the communication state in a data base for every one of the communication methods: reading a line memory relevant to one communication terminal from the data base when a communication request is made with respect to the one communication terminal from other communication terminal through one communication method; checking whether or not the one communication terminal is currently busy in accordance with the line memory relevant to the one communication terminal and judging whether or not the communication request should be allowed; and connecting a communication circuit between the one and other communication terminals when the judgment result is affirmative and transmitting an announcement information to the other communication terminal through the one communication method when the judgement result is negative, informing the other communication terminal that the one communication terminal is currently busy.

Further, according to the invention as defined in claim 5, there is provided a communication switching system for controlling communications that are performed through multiple communication methods by connecting and switching communication circuits between individual communication terminals, comprising a data base for managing a line memory indicating a communication state of the communication terminals for every one of the communication methods; read means for reading the line memory of the communication terminal from the data base when an incoming call is made with respect to the communication terminal; and notice means for notifying that the incoming call is received, through the communication method by which a communication is undergoing when the line memory indicates that the communication terminal is currently busy through a communication method different from that through which the incoming call is made.

Further, according to the invention as defined in claim 6, there is provided a communication switching system for controlling communications that are performed through multiple communication methods by connecting and switching communication circuits between individual communication terminals, comprising a data base for managing a line memory indicating a communication state of the communication terminal for every one of the communication methods and terminal information indicating whether or not the communication terminal can perform a simultaneous communication through multiple communication methods; read means for reading the line memory and the terminal information from the data base when an incoming call is made with respect to the communication terminal; and notice means for notifying that the incoming call is received, through the communication method by which a communication is undergoing, in case the line memory indicates that the communication terminal is currently busy through a communication method different from that through which the incoming call is made and the terminal information indicates that the communication terminal cannot perform a simultaneous communication through multiple communication methods.

Further, according to the invention as defined in claim 7, the communication switching system further comprises means for connecting the incoming call to the communication terminal upon receipt of instructions for changing the communication from the communication terminal.

Further, according to the invention as defined in claim 8, there is provided a communication switching system for controlling communications that are performed through multiple communication methods by connecting and switching communication circuits between individual communication terminals, comprising a data base for managing a line memory indicating a communication state of the communication terminal for every one of the communication methods and terminal information indicating whether or not the communication terminal can perform a simultaneous communication through multiple communication methods; read means for reading the line memory and the terminal information from the data base when an incoming call is made with respect to the communication terminal; storage means for receiving and storing a communication information from the incoming call, in case the line memory indicates that the communication terminal is currently busy through a communication method different from that through which the incoming call is made and the terminal information indicates that the communication terminal cannot perform a simultaneous communication through multiple communication methods; notice means for notifying the communication terminal to store the communication information; and transmission means for transmitting the communication information stored in the storage means to the communication terminal in accordance with instructions from the communication terminal.

Further, according to the invention as defined in claim 9, there is provided a communication switching system for controlling communications that are performed through multiple communication methods by connecting and switching communication circuits between individual communication terminals, comprising a data base for managing a line memory indicating a communication state of the communication terminal for every one of the communication methods and terminal information indicating whether or not the communication terminal can perform a simultaneous communication through multiple communication methods; read means for reading the line memory and the terminal information from the data base when an incoming call is made with respect to the communication terminal; storage means for receiving and storing a communication information from the incoming call, in case the line memory indicates that the communication terminal is currently busy through a communication method different from that through which the incoming call is made and the terminal information indicates that the communication terminal cannot perform a simultaneous communication through multiple communication methods; and transmission means for transmitting the communication information stored in the storage means to the communication terminal through the communication method by which a communication is undergoing.

Further, according to the invention as defined in claim 10, there is provided a communication switching system for controlling communications that are performed through multiple communication methods by connecting and switching communication circuits between individual communication terminals, comprising a data base for managing a line memory indicating a communication state of the communication terminal for every the communication method and terminal information indicating whether or not the communication terminal can perform a simultaneous communication through multiple communication methods; read means for reading the line memory and the terminal information from the data base when an incoming call is made with respect to the communication terminal; and notice means for notifying, in order to perform a simultaneous communication, that an incoming call is made with respect to the communication terminal, in case the line memory indicates that the communication terminal is currently busy through a communication method different from that through which the incoming call is made and the terminal information indicates that the communication terminal can perform a simultaneous communication through multiple communication methods.

Further, according to the invention as defined in claim 11, multiple communication methods include a voice communication method and a packet communication method.

Further, according to the invention as defined in claim 12, there is provided a communication switching system for controlling communications performed through a voice communication method and a packet communication method by connecting and switching communication circuits between individual communication terminals, comprising a data base for managing a line memory indicating a communication state of the communication terminal for every one of the communication methods; read means for reading a line memory relevant to one communication terminal from the data base when a communication request is made with respect to the one communication terminal from other communication terminal through the voice communication method; judgment means for checking whether or not the one communication terminal is currently busy through either the voice communication method or the packet communication method in accordance with the line memory thus read which is relevant to the one communication terminal and judging whether or not the communication request should be allowed; and connecting circuit means for connecting a communication circuit between the one and other communication terminals when the judgment result is affirmative; and announcement information transmission means for transmitting an announcement information to the other communication terminal through the voice communication method when the judgement result is negative, informing the other communication terminal that the one communication terminal is currently busy.

Further, according to the invention as defined in claim 13, there is provided a communication switching system for controlling communications performed through a voice communication method and a packet communication method by connecting and switching communication circuits between individual communication terminals, comprising a data base for managing a line memory indicating a communication state of the communication terminal for every one of the communication methods; read means for reading the line memory of the communication terminal from the data base when an incoming call is made with respect to the communication terminal; and notice means for notifying through the packet communication method that an incoming call is made with respect to the communication terminal, in case the line memory thus read indicates that the communication terminal is currently busy through the packet communication method when the incoming call thus received is transmitted through the voice communication method.

Further, according to the invention as defined in claim 14, there is provided a communication switching system for controlling communications performed through a voice communication method and a packet communication method by connecting and switching communication circuits between individual communication terminals, comprising a data base for managing a line memory indicating a communication state of the communication terminal for every one of the communication methods and terminal information indicating whether or not the communication terminal can perform a simultaneous communication through the voice communication method and the packet communication method; read means for reading the line memory of the communication terminal and the terminal information from the data base when an incoming call is made with respect to the communication terminal; and notice means for notifying through the packet communication method that an incoming call is made with respect to the communication terminal, in case the line memory indicates that the communication terminal is currently busy through the packet communication method and the terminal information indicates that the terminal cannot perform a simultaneous communication between the voice communication method and the packet communication method when the incoming call thus received is transmitted through the voice communication method.

Further, according to the invention as defined in claim 15, there is provided a communication switching system for controlling communications performed through a voice communication method and a packet communication method by connecting and switching communication circuits between individual communication terminals, comprising a data base for managing a line memory indicating a communication state of the communication terminal for every one of the communication methods and terminal information indicating whether or not the communication terminal can perform a simultaneous communication through the voice communication method and the packet communication method; read means for reading the line memory of the communication terminal and the terminal information from the data base when an incoming call is made with respect to the communication terminal; and notice means for notifying through the voice communication method that an incoming call is made with respect to the communication terminal, in case the line memory indicates that the communication terminal is currently busy through the voice communication method and the terminal information indicates that the terminal cannot perform a simultaneous communication between the voice communication method and the packet communication method when the incoming call thus received is transmitted through the packet communication method.

Further, according to the invention as defined in claim 16, there is provided a communication switching system for controlling communications performed through a voice communication method and a packet communication method by connecting and switching communication circuits between individual communication terminals, comprising a data base for managing a line memory indicating a communication state of the communication terminal for every one of the communication methods and terminal information indicating whether or not the communication terminal can perform a simultaneous communication through the voice communication method and the packet communication method; read means for reading the line memory of the communication terminal and the terminal information from the data base when an incoming call is made with respect to the communication terminal; voice storage means for receiving and storing a communication information from the incoming call, in case the line memory indicates that the communication terminal is currently busy through the packet communication method and the terminal information indicates that the terminal cannot perform a simultaneous communication between the voice communication method and the packet communication method when the incoming call thus received is transmitted through the voice communication method; means for notifying the communication terminal that the communication information is stored in the voice storage means; and transmission means for transmitting the communication information stored in the voice storage means in accordance with instructions from the communication terminal.

Further, according to the invention as defined in claim 17, there is provided a communication switching system for controlling communications performed through a voice communication method and a packet communication method by connecting and switching communication circuits between individual communication terminals, comprising a data base for managing a line memory indicating a communication state of the communication terminal for every one of the communication methods and terminal information indicating whether or not the communication terminal can perform a simultaneous communication through the voice communication method and the packet communication method; read means for reading the line memory of the communication terminal and the terminal information from the data base when an incoming call is made with respect to the communication terminal; packet storage means for receiving and storing a communication information from the incoming call, in case the line memory indicates that the communication terminal is currently busy through the voice communication method and the terminal information indicates that the terminal cannot perform a simultaneous communication between the voice communication method and the packet communication method when the incoming call thus received is transmitted through the packet communication method; means for notifying the communication terminal that the communication information is stored in the packet storage means; and transmission means for transmitting the communication information stored in the packet storage means in accordance with instructions from the communication terminal.

Further, according to the invention as defined in claim 18, there is provided a communication switching system for controlling communications performed through a voice communication method and a packet communication method by connecting and switching communication circuits between individual communication terminals, comprising a data base for managing a line memory indicating a communication state of the communication terminal for every one of the communication methods and terminal information indicating whether or not the communication terminal can perform a simultaneous communication through the voice communication method and the packet communication method; read means for reading the line memory of the communication terminal and the terminal information from the data base when an incoming call is made with respect to the communication terminal; storage means for receiving and storing a voice communication information from the incoming call, in case the line memory indicates that the communication terminal is currently busy through the packet communication method, which is different from the voice communication method and the terminal information indicates that the terminal cannot perform a simultaneous communication through the voice communication method and the packet communication method; and transmission means for transmitting the voice communication information stored in the storage means through the packet communication method.

Further, according to the invention as defined in claim 19, there is provided a communication switching system for controlling communications performed through a voice communication method and a packet communication method by connecting and switching communication circuits between individual communication terminals, comprising a data base for managing a line memory indicating a communication state of the communication terminal for every one of the communication methods and terminal information indicating whether or not the communication terminal can perform a simultaneous communication through the voice communication method and the packet communication method; read means for reading the line memory of the communication terminal and the terminal information from the data base when an incoming call is made with respect to the communication terminal; and means for notifying, in order to perform a simultaneous communication, that an incoming call is made with respect to the communication terminal, in case the line memory indicates that the communication terminal is currently busy through a communication method different from that through which the incoming call is made and the terminal information indicates that the communication terminal can perform a simultaneous communication through the voice communication method and the packet communication method.

Further, according to the invention as defined in claim 20, the communication switching system comprises multiple switching centers corresponding to communication methods through which communications are performed between the communication terminals, and a subscribers' information managing center for performing communication with the switching centers, the subscribers' information managing center comprising the data base; a control unit for reading and writing information with respect to the data base; and an interface unit for performing a communication between the control unit and each of the switching centers.

(Function)

According to the invention of claim 1, the line memory indicating the communication state of each communication terminal is written in the data base for every communication method by the write means. The read means reads the line memory relevant to one communication terminal from the data base when a communication request is made from other communication terminal to the afore-mentioned one communication terminal through one communication method. This makes it possible for the judgment means to make a judgment as to whether or not the communication request should be allowed based on the line memory telling that the line is busy by such and such communication method.

Similarly, according to the invention of claim 2, in case the communication request should be allowed, the communication circuit between the afore-mentioned other communication terminal and the afore-mentioned communication terminal is connected. On the other hand, in case the communication request should not be allowed, an announcement information is transmitted to the other communication terminal, informing that the one communication terminal is currently busy.

Similarly, according to the invention of claim 3, the communication switching system transmits the announcement information through the afore-mentioned one communication method by which the communication request is made. Accordingly, the afore-mentioned other communication terminal can know that the afore-mentioned one communication terminal is currently busy.

Similarly, according to the invention of claim 4, the line memory indicating the communication state of each communication terminal is written in the data base for every communication method. When a communication request is made to the afore-mentioned one communication terminal from the afore-mentioned other communication terminal through one communication method, a line memory relevant to the afore-mentioned one communication terminal is read from the data base. By this, a judgment is made as to whether or not the communication request should be allowed based on the line memory relevant not only to the one communication method but also to other communication methods. When the judgment result is negative, an announcement is made to the afore-mentioned other communication terminal through the one communication method, informing that the afore-mentioned one communication terminal is currently busy.

Similarly, according to the inventions of claims 5 and 7, a line memory indicating a communication state of the communication terminals is preliminarily managed in the data base for every one of the communication methods, and the line memory of the communication terminal is from the data base when an incoming call is made with respect to the communication terminal through the second communication method, which is different from the first communication method. The presence of an incoming call through the afore-mentioned other communication method is informed to the other communication terminal through the communication method by which a communication is undergoing. Thereafter, upon receipt of instructions for changing the communication from the communication terminal, the incoming call through the second communication method is connected.

Similarly, according to the inventions of claims 6 and 7, the terminal information indicating whether or not the communication terminal can perform a simultaneous communication through multiple communication methods is further managed in the data base. The line memory and the terminal information is read from the data base when an incoming call is made with respect to the communication terminal by the second communication method which is different from the first communication method. The presence of the incoming call by other communication method is notified, through the communication method by which a communication is undergoing, in case the line memory indicates that the communication terminal is currently busy through a communication method different from that through which the incoming call is made and the terminal information indicates that the communication terminal cannot perform a simultaneous communication through multiple communication methods. Thereafter, upon receipt of instructions for changing the communication from the communication terminal, the incoming call by the second communication method is connected.

Similarly, according to the invention of claim 8, the line memory and the terminal information is read from the data base when an incoming call is made by the second communication method which is different from the first communication method, and the communication information received by the second communication method is stored, in case the line memory indicates that the communication terminal is currently busy and the terminal information indicates that the communication terminal cannot perform a simultaneous communication through multiple communication methods. Then, the fact that the communication information has been stored is informed to the communication terminal. Then, in accordance with the instructions from the communication terminal, the stored communication information is transmitted to the communication terminal.

Similarly, according to the invention of claim 9, the line memory of the communication terminal and the terminal information is read from the data base when an incoming call is made with respect to the communication terminal which is currently busy by the second communication method which is different from the first communication method through which the communication is undergoing, and the communication information received by the second communication method is stored, in case the line memory indicates that the communication terminal is currently busy and the terminal information indicates that the communication terminal cannot perform a simultaneous communication through multiple communication methods. The stored communication information is transmitted to the communication terminal through the first communication method.

Similarly, according to the invention of claim 10, the line memory of the communication terminal and the terminal information is read from the data base when an incoming call is made with respect to the communication terminal through the second communication method which is different from the first communication method by which the communication is undergoing. Then, the fact that an incoming call is made with respect to the communication terminal is informed in order to perform a simultaneous communication, in case the line memory indicates that the communication terminal is currently busy and the terminal information indicates that the communication terminal can perform a simultaneous communication through multiple communication methods.

BEST MODE FOR CARRYING OUT THE INVENTION

1. First Embodiment

A. Constitution of First Embodiment

The outline of a constitution of a mobile communication network according to the first embodiment of the present invention, as well as the content of a data base as its main component element, will now be described with reference to FIGS. 1 and 2, respectively.

Figure 1:
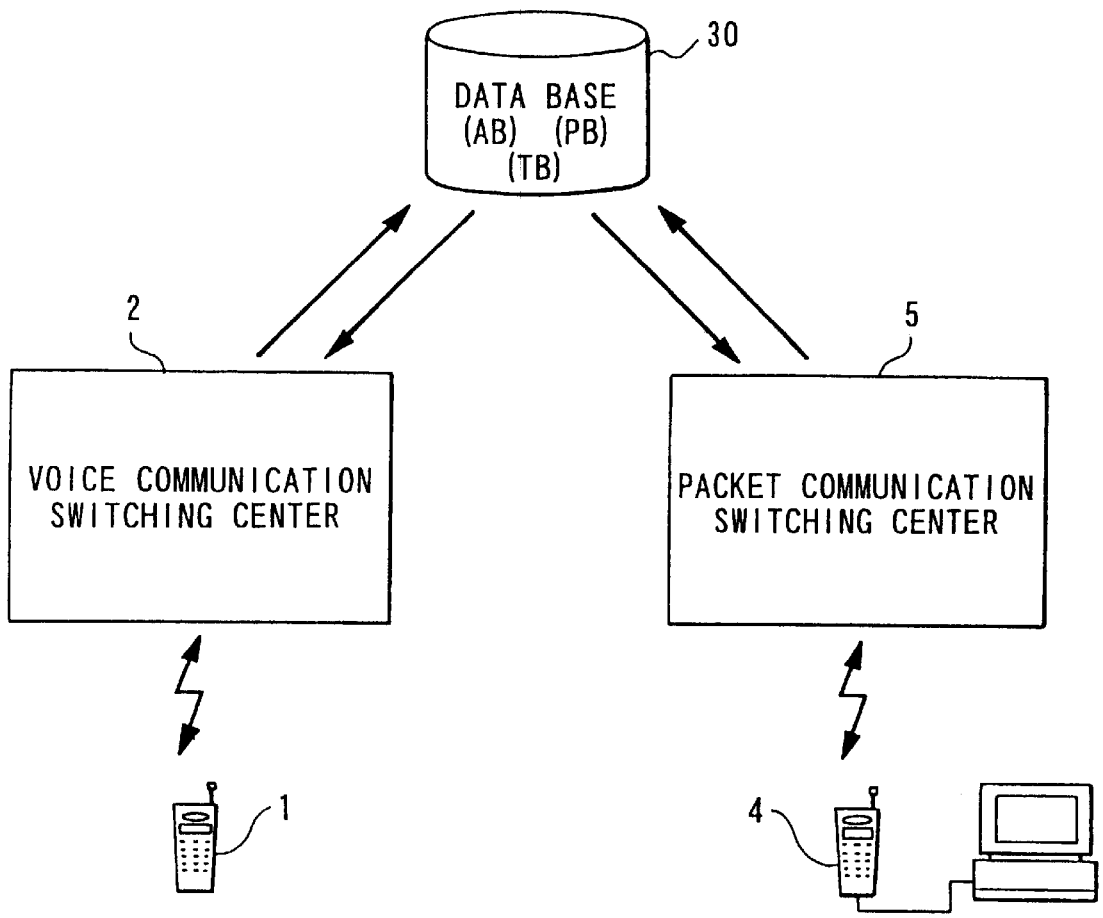
FIG. 1 is a block diagram showing a communication network, in which communication messages can be transmitted by multiple communication methods, according to one embodiment of the present invention.

In FIG. 1, reference numerals 1 and 4 respectively denote communication terminals usable in a mobile communication. The communication terminals 1 and 4 used in this embodiment are mobile telephones, respectively. The communication terminals 1 and 4 are applicable to both the voice communication method and packet communication method. For performing the packet communication method, a data exchange is made with respect to a data terminal through data input/output terminals, not shown. It should be noted that many communication terminals (not shown) other than the terminals 1 and 4 exist for performing communications in accordance with necessity.

Reference numeral 2 denote a voice communication switching center which is exclusively designed for a voice communication. The voice communication switching center 2 is operated to judge whether or not a voice communication request from one of the communication terminals should be allowed and then switch the voice communication line from one to another based on the judgment. Reference numeral 5 denotes a packet communication switching center which is exclusively designed for a packet communication. The packet communication switching center 5 is operated to judge whether or not a packet communication request from one of the communication terminals should be allowed and then switch the packet communication line from one to another based on the judgment. The voice communication switching center 2 is operated to transmit and receive a voice information with respect to other voice communication switching centers through other networks, not shown. On the other hand, the packet communication switching center 5 is also operated to transmit and receive a package information with respect to another packet communication switching center through another network, not shown.

Reference numeral 30 denotes a data base in which managed are various data which indicate communication states of individual communication terminals. The data managed in this data base 30 include location information indicating the areas to which the individual communication terminals visit, and other information such as a voice line memory AB indicating whether or not a voice communication is undergoing, a packet line memory PB indicating whether or not a packet communication is undergoing, and a terminal information TB indicating whether or not a simultaneous communication should be allowed. Accordingly, it becomes possible for the voice communication switching center 2 and the packet communication switching center 5 to know the states of the individual communication terminals by accessing to the data base 30. It should be noted that in case simultaneous communication should not be allowed between different communication methods at all, it is not necessary to manage the terminal information TB. In the first embodiment, since no simultaneous communication should be allowed, the terminal information TB is not managed in the data base 30. However, in the second and the third embodiment to follow, there are some instances where a simultaneous communication should be allowed, and therefore the terminal information TB is managed in the data base 30.

Figure 2A:
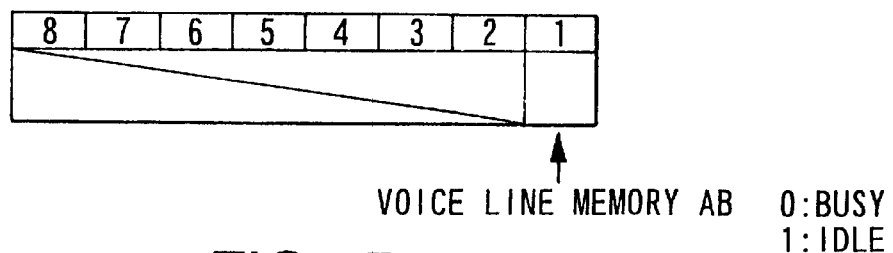
FIGS. 2A–2B are conceptual views for explaining voice line memory AB and packet line memory PB managed in a data base.

The voice line memory AB and the packet line memory PB will now be described with reference to FIG. 2. FIG. 2(A) shows information about voice communications managed in the data base 30. This information is provided to each communication terminal. As illustrated, an 8-bits storage area is plotted to each communication terminal. In this case, the first bit is for the voice line memory AB. If this bit is "0", it indicates that a voice communication is undergoing (i.e., communication line is busy), and if "1", it indicates that no voice communication is undergoing (i.e., communication line is "idle").

Figure 2B:
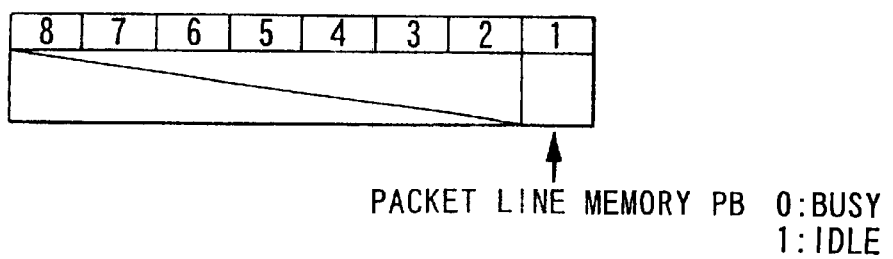

Similarly, FIG. 2(B) shows information about packet communications managed in the data base 3. This information is provided to each communication terminal. As illustrated, an 8-bit storage area is plotted to each communication terminal. The first bit is for the packet line memory PB. If this bit is "0", it indicates that a packet communication is undergoing (i.e., communication line is busy), and if "1", it indicates that no packet communication is undergoing (i.e., communication line is not-busy). The remaining bits are empty bits reserved for future extensibility.

Figure 3:
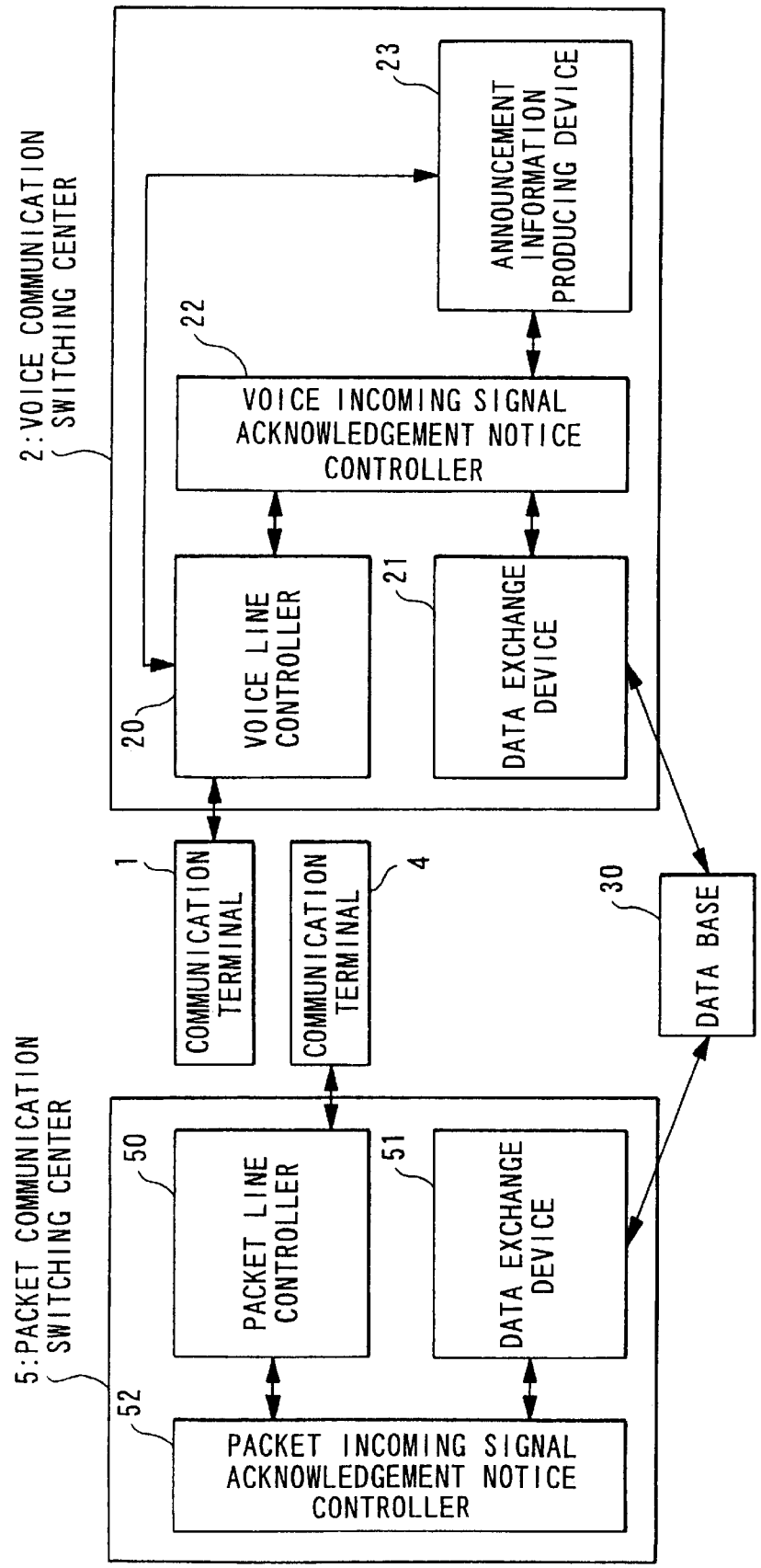
FIG. 3 is a block diagram showing a communication switching system according to the first embodiment of the present invention.

The voice communication switching center 2 will now be described. FIG. 3 is a block diagram showing detailed constitutions of the voice communication switching center 2 and the packet communication switching center 5. In this Figure, reference numeral 20 denotes a voice line controller 20. This voice line controller is operated to specify the communication terminal of the other party in accordance with a voice communication request from the communication terminal and judge whether or not the voice communication request should be allowed based on the voice line memories AB and the packet line memory PB. In case the voice communication request should be allowed, a voice line of the communication terminal requesting the voice communication is connected to a voice line of the communication terminal which is allowed to receive a voice communication, and the voice communication lines are disconnected when the communication is over.

Reference numeral 21 denotes data exchange device. This data exchange device 21 is operated to read and write information about voice communications with respect to the data base 30 and read information about packet communications from the data base 30. In this way, information about a voice communication and a packet communication is read from the data base 30 and therefore, it is not only the voice line memory AB but also the packet line memory PB that are taken into the voice communication switching center 2.

Reference numeral 23 denotes an announcement information producing device. This announcement information producing device 23 is operated to produce an announcement information informing that a communication cannot be performed in case the other party is currently busy. Reference numeral 22 denotes a voice incoming signal acknowledgement notice controller. This voice incoming signal acknowledgement notice controller 22 is operated to perform such procedures that are to be performed when the voice communication request is not accepted. Specifically, it instructs the announcement information producing device 23 to produce an announcement information.

The packet communication switching center 5 will now be described. Reference numeral 50 denotes a packet line controller. This packet line controller 50 is operated to detect a generation of a packet incoming signal and specify the communication terminal of the other party in accordance with a packet communication request from the communication terminal. Further, the packet line controller 50 makes a decision whether or not the packet communication request should be allowed based on the voice line memory AB and the packet line memory PB. In case the packet communication request should be allowed, the packet line controller 50 connects the packet line of the communication terminal which requests the packet communication to that of the communication terminal which can receive the packet communication and disconnects the packet line when the communication is finished. Reference numeral 51 denotes a data exchange device. The packet line controller 50 is operated to read and write the information relevant to the packet communication with respect to the data base 30. The packet line controller 50 reads the information relevant to the voice communication from the data base 30. Reference numeral 52 denotes a packet incoming signal acknowledgement notice controller which corresponds to the voice incoming signal acknowledgement notice controller 22. The procedure necessary for a case where the communication request should not be allowed is executed by this packet incoming signal acknowledgement notice controller 52.

B. Operation of the First Embodiment

Operation of the first embodiment will now be described with reference to FIGS. 4 and 5. Like parts of FIGS. 1 and 3 are denoted by like reference numerals and description thereof is omitted.

Figure 4:
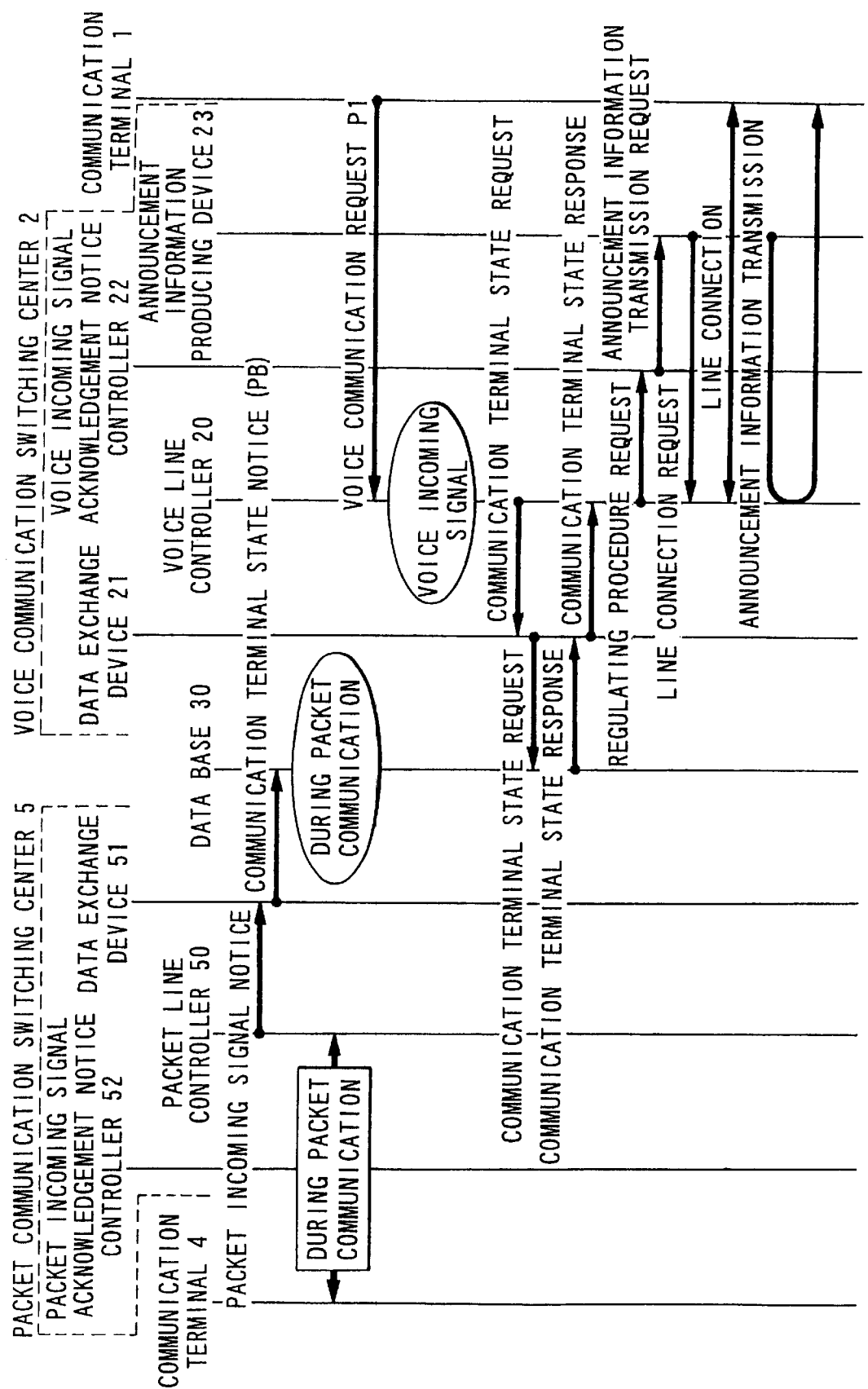
FIG. 4 is a sequence diagram for explaining operation of the first embodiment.
Figure 5:
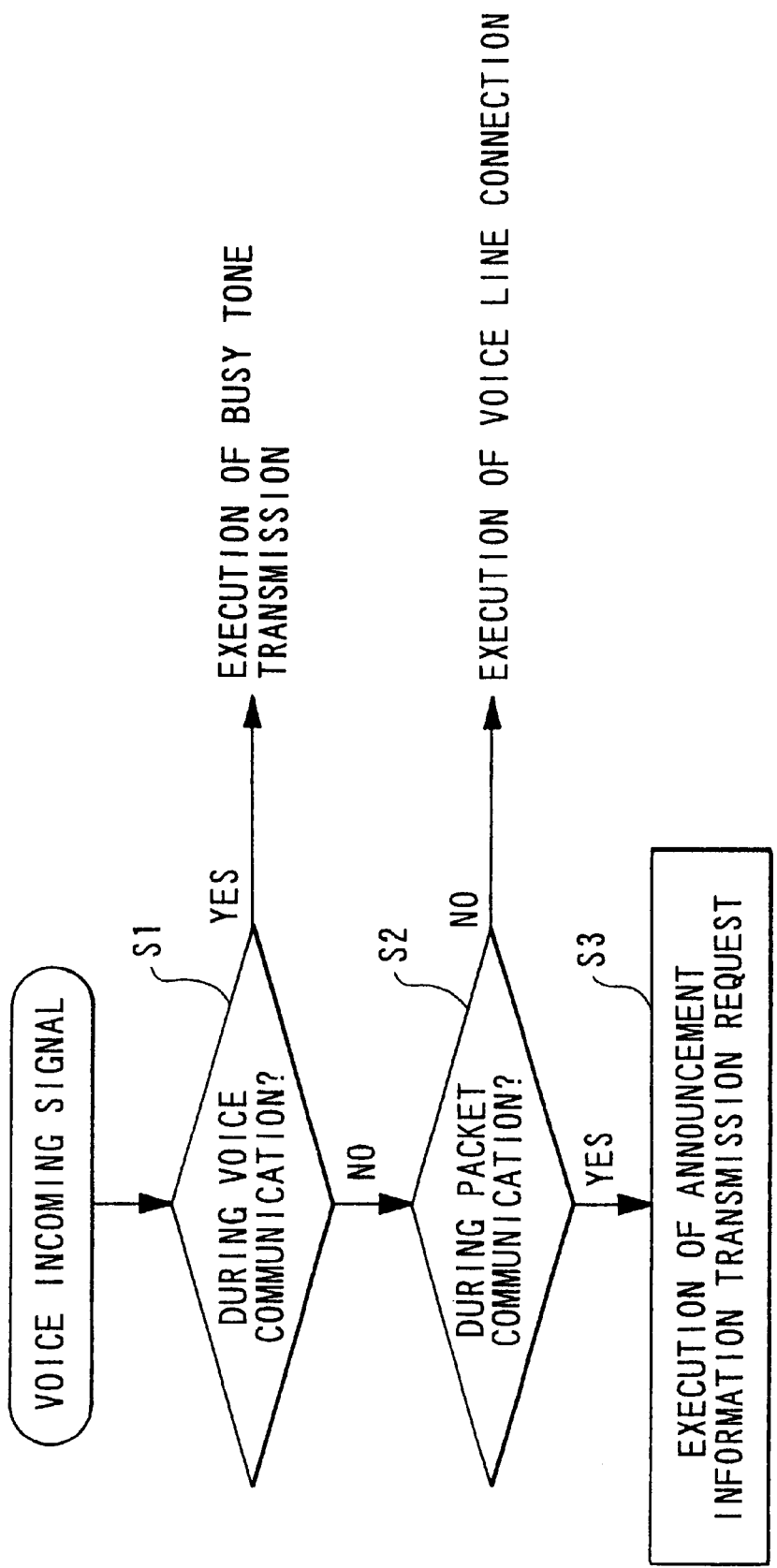
FIG. 5 is a flow chart for explaining operation of a voice receipt notice control unit according to the first embodiment.

In FIG. 4, presuming that the communication terminal 4 is currently busy with other communication terminal, not shown, through a packet communication method, the packet line controller 50 notifies the packet communication incoming call acknowledgement notice to the data exchange device 51 prior to start of this communication. The data exchange device 51 transmits the packet line memory PB to the data base 30, informing that the communication terminal 4 is currently busy with a packet communication. When the data base 30 receives this communication terminal state information, the packet line memory PB is managed in a storage area which is assigned to the communication terminal 4. As a consequence, the packet line memory PB relevant to the communication terminal 4 becomes "0" which indicates that a packet communication is undergoing. Since no voice communication is undergoing, the voice line memory AB relevant to the voice communication is kept "1" which indicates that the communication line is "not-busy".

Accordingly, by accessing to the data base 30, the communication state of the communication terminal 4 relevant not only to the voice communication but also to the packet communication can be known.

Next, in case the communication terminal 4 is currently busy with a packet communication, let us presume that the communication terminal 1 requests a voice communication to the communication terminal 4.

First, when the communication terminal 1 requests a voice communication (see P1 of FIG. 4), a voice incoming signal is generated at the voice line controller 20 in the voice communication switching center 2. When the voice line controller 20 detects the voice incoming signal, the voice line controller 20 transmits a communication terminal state request to the data switching device 21 in order to know the communication state of the communication terminal 4 as the other party. Upon receipt of this request, the data switching device 21 transmits a communication terminal state request to the data base 30. The data base 30 reads the voice and packet line memories AB, PB relevant to the communication terminal 4 and transmits the same to the voice line controller 20 through the data switching device 21 as a communication terminal state response.

Then, the voice line controller 20 makes a decision whether or not the voice communication line should be connected based on the voice and packet line memories AB, PB. In this case, since the communication terminal of the other party is currently busy with the packet communication, the voice line controller 20 notifies a regulating procedure request to the voice incoming signal acknowledgement notice controller 22. In this case, the voice incoming signal acknowledgement notice controller 22 notifies an announcement information transmission request to the announcement information producing device 23.

The terms "announcement information" used here refers to information for informing that the other party is currently busy, such as a voice message saying, for example, as "the person whom you call is currently busy with a packet communication and therefore cannot receive your voice call". If such a voice message, which indicates the communication method through which the other party is currently busy as ". . . currently busy with a packet communication . . .", the transmitter side can know the communication method in use. Thus, this is useful for the transmitter side to guess an approximate waiting time, etc.

When the announcement information producing device 23, which has received the announcement information transmission request, notifies a line connection request to the voice line controller 20, the voice line controller 20 connects a voice circuit between the communication terminal 1 and the announcement information producing device 23. Thereafter, the announcement information producing device 23 transmits an announcement information to the communication terminal 1 through the voice line controller 20. To confirm the connection of the circuit, a line connection complete response (not shown) is transmitted from the voice line controller 20 to the announcement information producing device 23. Similarly, to confirm the announcement information, an announcement information transmission start response (not shown) is transmitted from the announcement information producing device 23 to the voice incoming signal acknowledgement notice controller 22.

In this way, the user of the communication terminal 1, who has transmitted the voice communication request to the communication terminal 4, can know from the response by the voice communication method, telling that the communication terminal 4 is currently busy with a packet communication and therefore cannot receive a new communication.

The description hereinbefore made is based on an assumption that the other party is currently busy with a packet communication. The procedures are different in case the other party is currently idle with a communication or the other party is currently busy with a voice communication. Therefore, a general operation of the voice line controller 20 which has received the communication terminal state response will be described with reference to the flow chart of FIG. 5. When a voice incoming signal is generated, the operation is started and the process proceeds to Step S1. In Step S1, a judgment is made as to whether or not the communication terminal is currently busy with a voice communication with reference to the voice line memory AB. That is, in case the voice line memory AB is "0", the communication terminal is currently busy with a voice communication, therefore, "YES" is selected and busy tone is transmitted to the communication terminal 1 by a known means. In contrast, in case the voice line memory AB is "1", the communication terminal is currently idle with a communication and therefore, "NO" is selected. Then, the process proceeds to Step S2.

In Step S2, a judgment is made as to whether or not the communication terminal is currently busy with a packet communication with reference to the packet line memory PB. That is, in case the packet line memory PB is "1", the communication terminal is currently idle with a packet communication, and therefore, "NO" is selected. In this case, since both the voice communication and packet communication are currently idle, the voice line controller 20 connects the voice circuits of the communication terminals 1, 4. In contrast, in case the packet line memory PB is "0", the communication terminal is currently busy with a packet communication and therefore, "YES" is selected. Then, the process proceeds to Step S3.

In Step S3, the voice line controller 20 notifies a regulating procedure request to the voice incoming signal acknowledgement notice controller 22. The voice incoming signal acknowledgement notice controller 22, which has received this request, notifies an announcement information request to the announcement information producing device 23. Thereafter, the announcement information producing device 23 transmits the announcement information to the communication terminal 1 through the voice line controller 20.

In this way, the voice line controller 20 can appropriately execute the procedures with reference to the voice and packet line memories AB, PB. It should be noted that the sequence of FIG. 4 is a procedure in case the procedure of Step S3 is executed.

2. Second Embodiment

In the first embodiment, the fact that the other party is currently busy is notified to the communication terminal which has made a communication request (i.e., the communication terminal corresponding to the incoming call). On the other hand, in the second embodiment, a predetermined procedure to be described hereinafter is executed with respect to the communication terminal as the other party to which a communication request has been made (i.e., the incoming terminal to which the incoming call has been made).

A. Constitution of Second Embodiment

Figure 6:
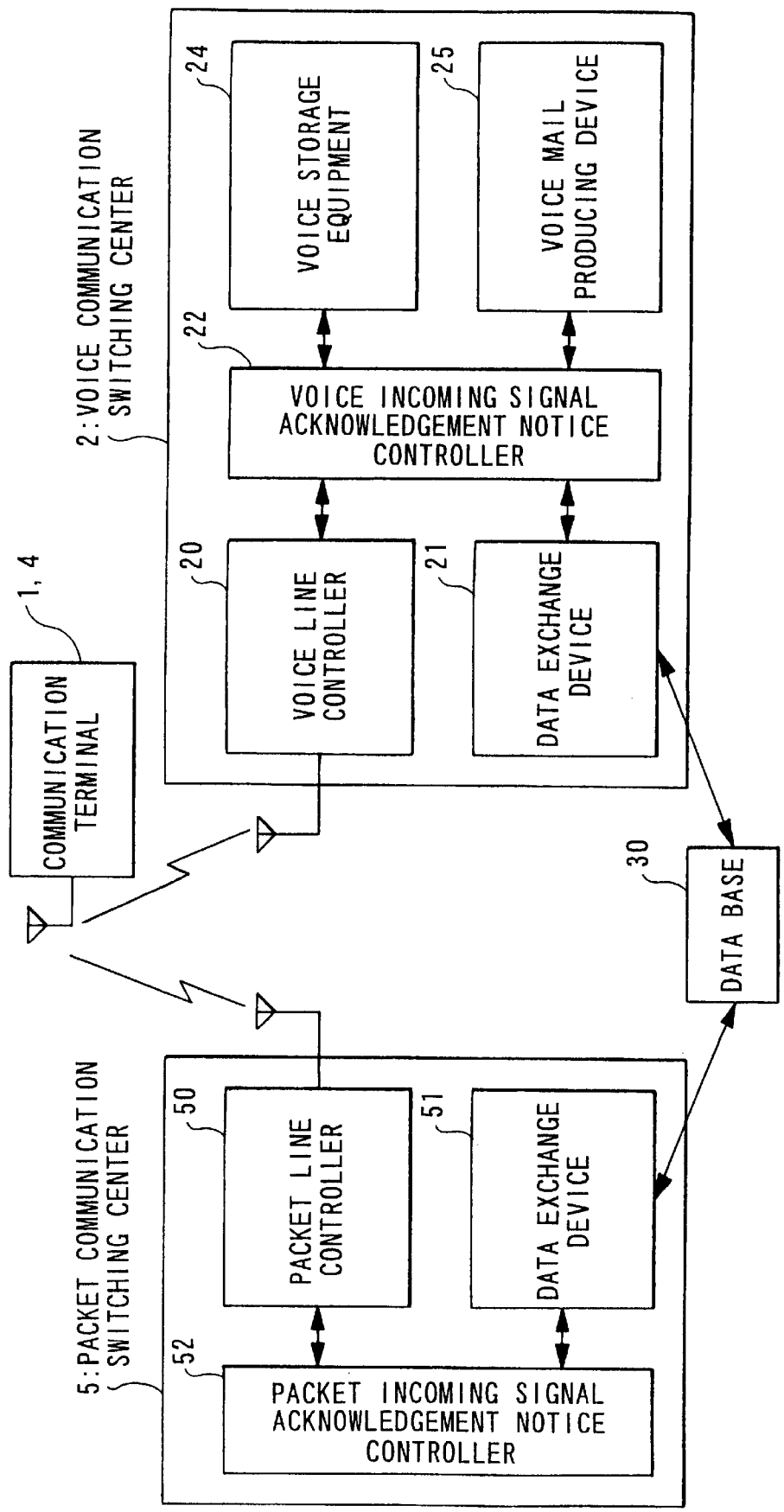
FIG. 6 is a block diagram of a communication switching system according to the second embodiment of the present invention.

The second embodiment is also used in the mobile communication network of FIG. 1 as in the case with the first embodiment. A block diagram of the communication switching system is shown in FIG. 6. In FIG. 6, like component parts of FIG. 3 are denoted by like reference numerals and description thereof is omitted.

Reference numeral 24 denotes a voice storage equipment. This voice storage equipment 24 is connected to a voice incoming signal acknowledgement notice controller 22. Voice information is stored in the voice storage equipment 24. In this example, voice is temporarily stored in the voice storage equipment 24 in case the other party is currently busy with a packet communication. After the communication is finished, the voice read from the voice storage equipment 24 is transmitted by the voice communication method. Reference numeral 25 denotes a voice mail producing device. This voice mail producing device 25 is connected to the voice incoming signal acknowledgement notice controller 22 and operated to convert voice information to data suitable for the packet communication method. This makes it possible to generate a voice mail by converting the voice information stored in the voice storage equipment 24 and transmit the same by the packet communication method. Reference numeral 52 denotes a packet incoming signal acknowledgement notice controller. This packet incoming signal acknowledgement notice controller 52 is connected to a packet line controller 50 and a data exchange device 51. The packet incoming signal acknowledgement notice controller 52 executes a procedure in case the packet communication is regulated.

B. Operation of Second Embodiment

B-1: Notice of Voice Incoming Signal

Figure 7:
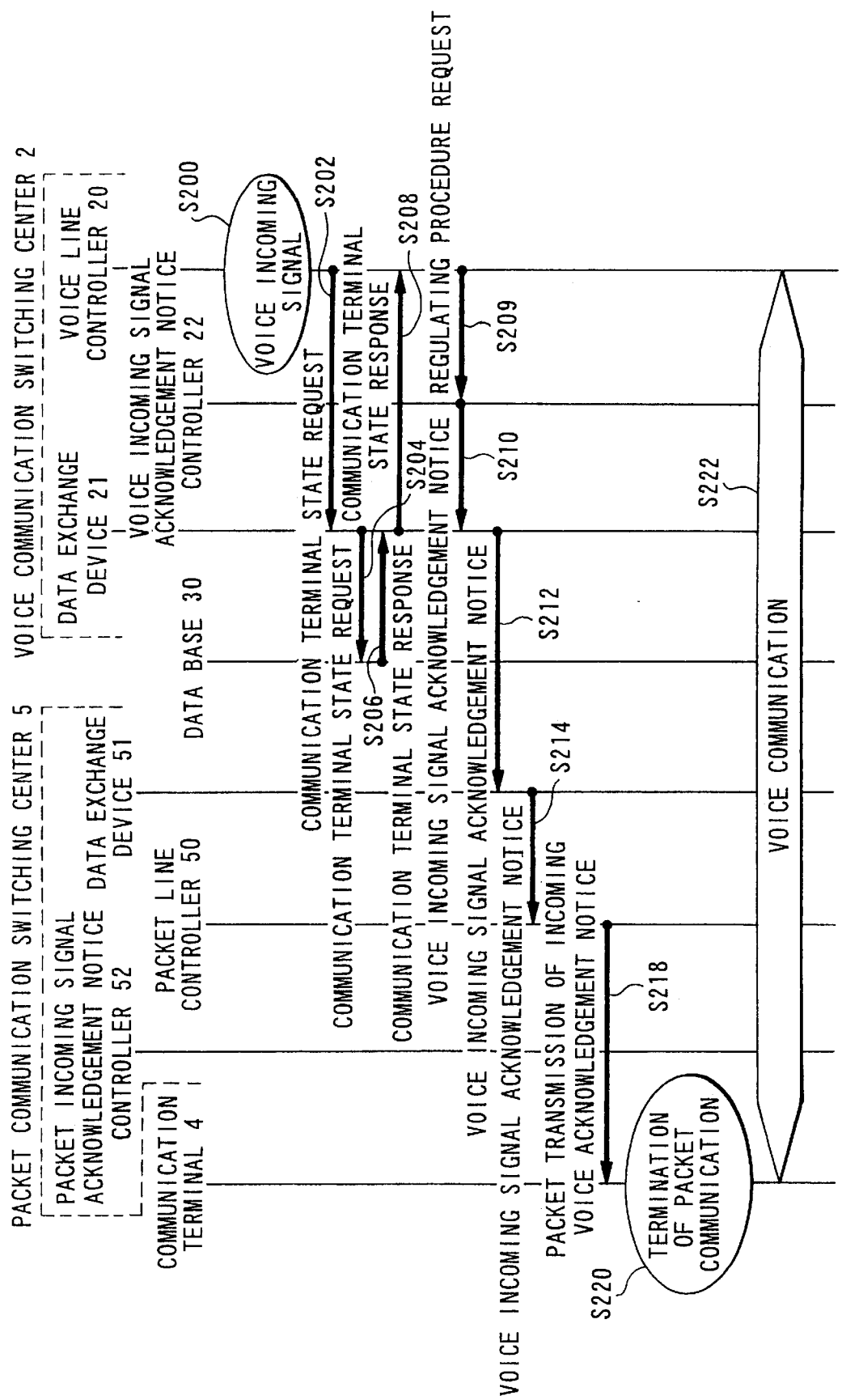
FIG. 7 is a sequence diagram for explaining operation for changing the mode of operation to a voice mode for an incoming voice communication according to the second embodiment.

A method of notice of a voice incoming signal in a communication switching system according to the second embodiment will now be described with reference to FIG. 7. When a voice incoming signal is made with respect to the communication terminal 4 (Step S200), the voice line controller 20 makes a communication terminal state request in order to search the state of the communication terminal 4 (S202). This communication terminal state request is delivered to the data base 30 via the data switching device 21 (S204). Then, the data base 30 reads the voice and packet line memories AB, PB indicating whether or not the communication terminal 4 is currently busy with the packet communication and returns the same as a communication terminal state response to the data switching device 21 of the voice communication switching center 2 (S202). The data switching device 21 transmits the received communication terminal state response to the voice line controller 20 (S208).

In this case, since a communication request is made with respect to the communication terminal 4 through the voice communication method, it is necessary to regulate a simultaneous communication of the voice communication method and the packet communication method, in case the packet line memory PB in the communication terminal response indicates that the communication terminal 4 is currently busy with a packet communication. For this purpose, the voice line controller 20 notifies a regulating procedure request to the voice incoming signal acknowledgement notice controller 22 (S209). Upon receipt of this request, the voice incoming signal acknowledgement notice controller 22 transmits a voice incoming signal acknowledgement notice to the data exchange device 51 of the packet communication switching center 5 through the data switching device 21 of a local terminal (S210, S212). Then, the data exchange device 51 transmits the voice incoming signal acknowledgement notice to the packet line controller 50 (S214). Thereafter, the packet line controller 50 transmits a voice incoming signal acknowledgement notice packet to the communication terminal 4 (S218).

By Steps S200 through S218, the fact that an incoming call has been made by the voice communication method to the communication terminal 4. Then, the packet communication is finished by the user's operation of the communication terminal 4 (S220), and the communication method is shifted to the voice communication method by connecting the communication terminal 4 to the voice circuit (S222). The sequence for connecting the voice circuit is known and description thereof is omitted.

As mentioned above, the fact that an incoming call has been made through the voice communication method with respect to the communication terminal 4 which is currently busy with a packet communication is notified by utilizing a packet in the packet communication method, thereby enabling to ask the user to shift the mode of communication to the voice communication. Thus, it becomes possible to shift the communication mode to the voice communication method by the user's operation.

In the above-mentioned embodiment, an incoming call is always notified through the packet communication, in case a voice incoming signal has been made with respect to the communication terminal 4 which is currently busy with a packet communication. However, in the future, a communication terminal capable of a simultaneous communication between multiple communication modes (for instance, between the voice communication method and the packet communication method) will come to be put into practice. As usual, an incoming call should be made to such a terminal by the voice communication method, even in case the packet communication is undergoing. For this purpose, the terminal information TB indicating whether or not each communication terminal can perform a communication in multiple communication modes is further managed in the data base 30. In case a voice incoming signal is made, the terminal information and the voice and packet line memories AB, PB are read from the data base 30. Only in case the fact that the communication terminal 4 is currently busy through the packet communication method is indicated by the voice and packet line memories AB PB and the fact that the communication terminal cannot perform a simultaneous communication through multiple communication methods is indicated by the terminal information TB, the incoming call acknowledgement notice (S200 through S218) may be made.

B-2: Reproduction of Stored Voice

Figure 8:
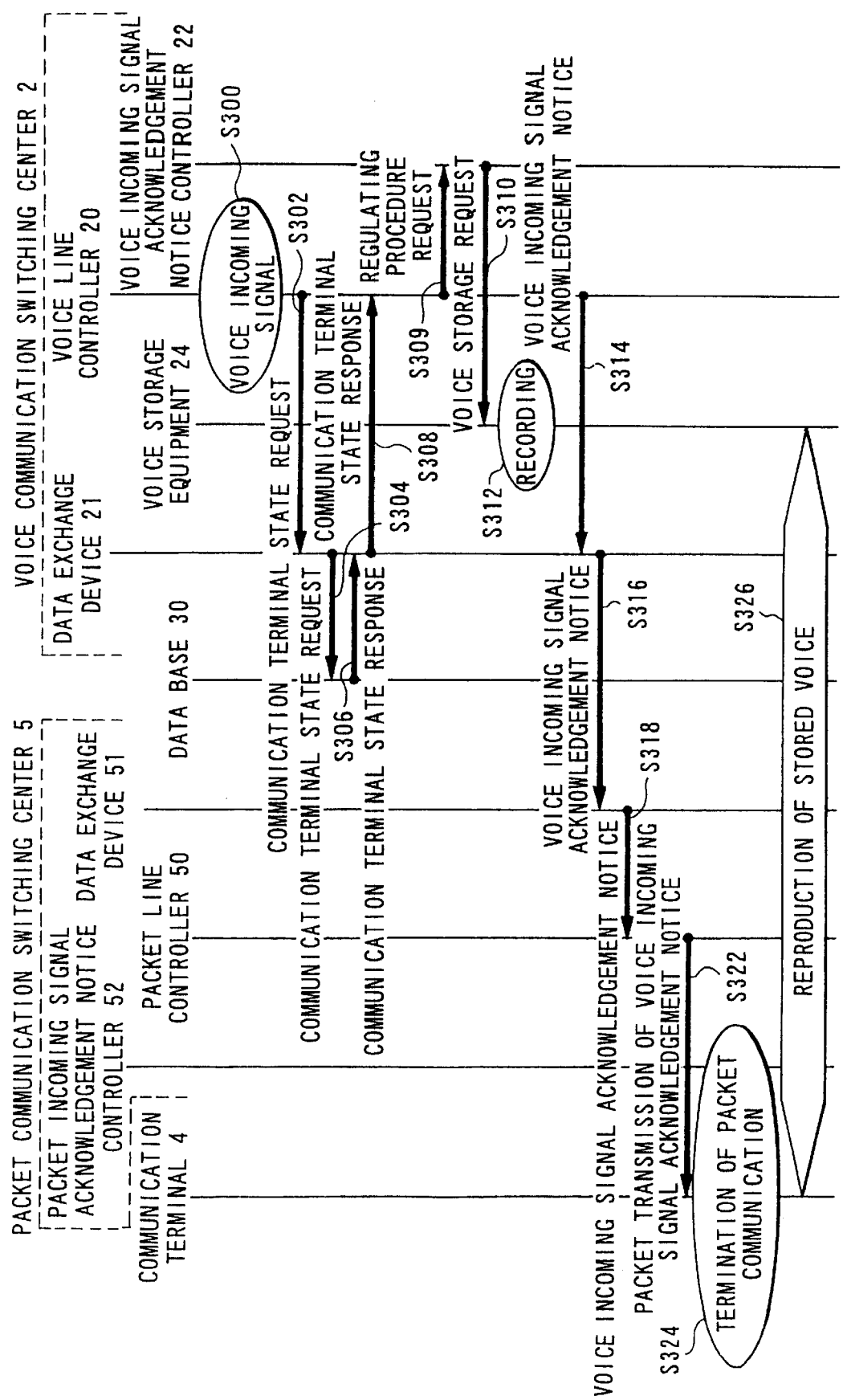
FIG. 8 is a sequence diagram for explaining operation for connecting the incoming voice communication to an storage equipment according to the second embodiment.

A reproduction method of stored voice in a communication switching system according to the second embodiment will now be described with reference to FIG. 8. When an incoming signal by the voice communication method (voice incoming signal) is made with respect to the communication terminal 4 (S300), the voice line controller 20 issues a communication terminal state request to the data switching device 21 in order to search the state of the communication terminal 4 (S302). Then, the data switching device 21, issues a communication terminal state request to the data base 30 (S304).

The data base 30 reads the voice and packet line memories AB, PB indicating whether or not the communication terminal 4 is currently busy with a packet communication and returns the same to the data switching device 21 of the voice communication switching center 2 as a communication terminal state response (S306). The data switching device 21 transmits the communication terminal state response received from the data base 30 to the voice line controller 20 (S308).

Here, in case the fact that the communication terminal 4 is currently busy with a packet communication is indicated by the packet line memory PB in the communication terminal state response, the voice line controller 20 notifies a regulating procedure request to the voice incoming signal acknowledgement notice controller 22 (S309). Upon receipt of this request, the voice incoming signal acknowledgement notice controller 22 transmits a voice storage request to the voice storage equipment 24 (S310). Then, the voice storage equipment 24 stores the voice received from the voice circuit (S312). The voice line controller 20 also transmits a voice incoming signal information to the data exchange device 51 of the packet communication switching center 5 through the data switching device 21 of the local terminal (S314, S316). Then, the data exchange device 51 transmits a voice call acknowledgement notice to the packet line controller 50 (S318). Thereafter, the packet line controller 50 transmits a voice incoming signal acknowledgement notice packet to the communication terminal 4 and requests that the user reproduces the voice connected to and stored in the voice storage equipment 24 by the user after the packet communication has been finished is reproduced. This request may be a notice which merely notifies the fact that a voice, which is addressed to the communication terminal 4 is recorded, to the communication terminal 4 (S322). When the packet communication is finished (S324), the voice stored in the voice storage equipment 24 is reproduced and transmitted to the communication terminal 4 by means of an input from a control panel of the communication terminal 4 (S324).

In this embodiment, as one example of the "communication information" defined in the appended claims, a voice received by the voice communication method is used, and as one example of the "storage means", the voice storage equipment 24 is used. However, it should be noted that the scope of the present invention should not be limited to such an embodiment and that any optional "communication information" which can be obtained by communication may be stored in the "storage means". As such "communication information", there can be listed, for example, facsimile image information, movie picture information and the like.

Also, an arrangement is acceptable in which, as in the case with the voice incoming signal acknowledgement notice mentioned above, the voice and packet line memories AB, PB and the terminal information TB of the communication terminal 4 are managed in the data base 30, and the communication information is stored only in case the communication terminal 4 is currently busy through a communication method different from the communication method of the incoming signal and a simultaneous communication cannot be made by multiple communication methods.

B-3: Transmission of Voice Mail

Figure 9:
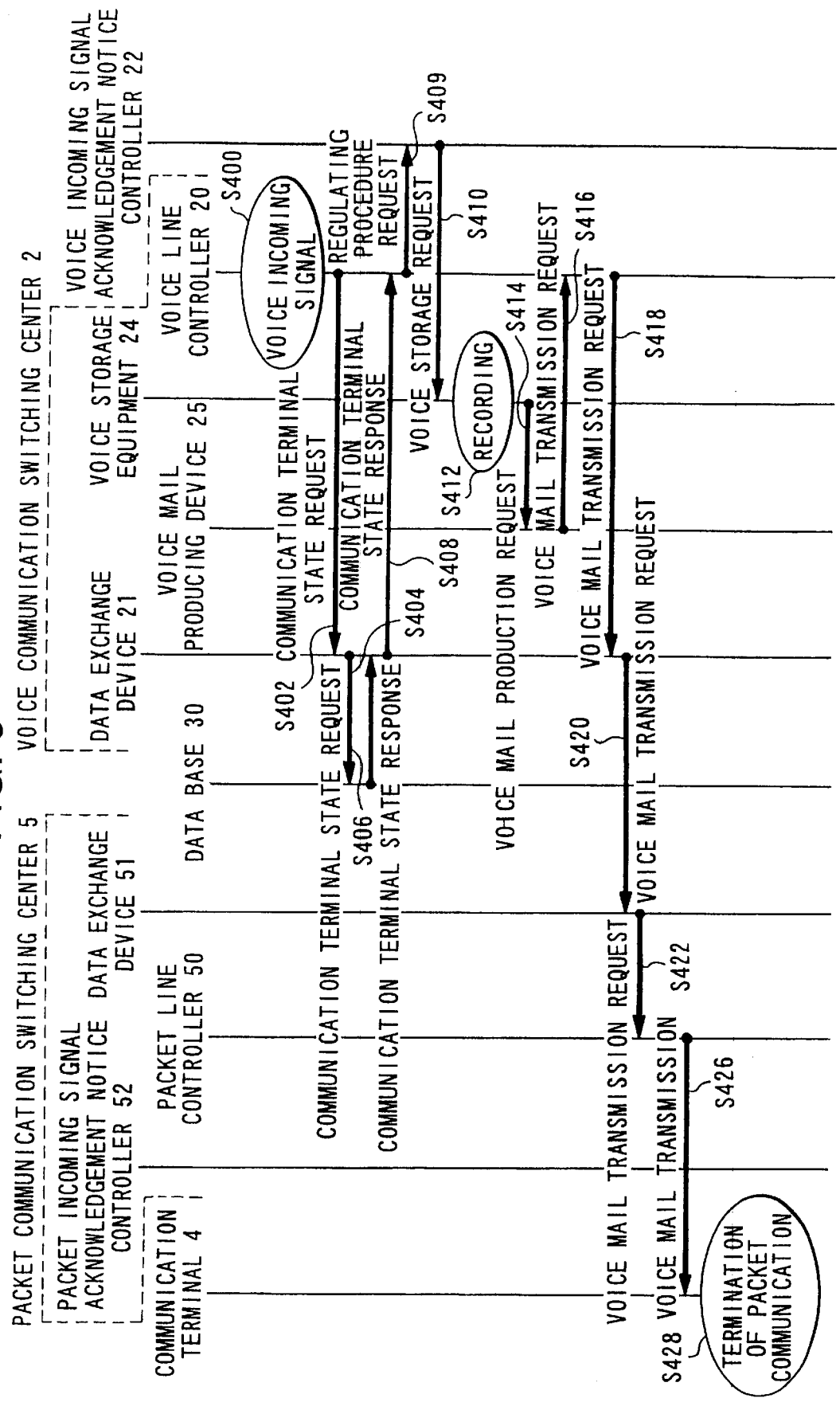
FIG. 9 is a sequence diagram for explaining operation for converting an incoming voice communication to a voice mail and then transmitting the same according to the second embodiment.

A method for transmitting a voice mail in a communication switching system according to the second embodiment will now be described with reference to FIG. 9. When a voice incoming signal is made with respect to the communication terminal 4 (S400), the voice line controller 20 issues a communication terminal state request to the data switching device 21 in order to search the state of the voice storage equipment 24 (S402). The data switching device 21, in turn, transmits the communication terminal state request to the data base 30 (S404). The data base 30 reads the voice and packet line memories AB, PB indicating whether or not the communication terminal 4 is currently busy with a packet communication and returns the same to the data switching device 21 of the voice communication switching center 2 by the communication terminal state response (S406). The data switching device 21 transmits the communication terminal state response to the voice line controller 20 (S408). Thereafter, the voice line controller 20 notifies a regulating procedure request to the voice incoming signal acknowledgement notice controller 22 (S409).

Here, in case the packet line memory PB in the communication terminal state response indicates that the communication terminal 4 is currently busy with a packet communication, the voice incoming signal acknowledgement notice controller 22 returns the voice storage request to the voice storage equipment 24 (S410). Upon receipt of this request, the voice storage equipment 24 stores the voice in response to the voice incoming signal (S412). The voice storage equipment 24 in which the voice has been stored transmits the voice mail production request and the stored voice information to the voice mail producing device 25 (S414). Then, the voice storage equipment 24 produces a voice mail utilizing the received voice information, includes the same in a voice mail transmission request and transmits the same to the voice line controller 20 (S416).

The voice line controller 20 transmits the voice mail transmission request including the voice information to the data exchange device 51 of the packet communication switching center 5 through the data switching device 21 of the local terminal (S418, S420). The data exchange device 51 transmits the voice mail transmission request including the voice information to the packet line controller 50 (S422). Upon receipt of this request, the packet line controller 50 transmits a voice mail to the communication terminal 4 (S426), requesting that the user reproduces the voice mail.

Also in this procedure, as in the case with the reproduction of the stored voice or the acknowledgement notice of the voice incoming signal, the terminal information TB indicating whether or not the communication terminal can simultaneously perform communications by multiple communication methods is managed in the data base 30. In case the voice and packet line memories AB, PB managed in the data base 30 indicate that the communication terminal is currently busy by a different communication method from that of the incoming call and the terminal information TB indicates that the communication terminal cannot simultaneously perform communications by multiple communication methods, a voice mail may be transmitted by means of the procedures of Step S409 through S428.

Also, in Step S426, an incoming call of a voice mail is notified to the communication terminal 4 first and then the voice mail may be transmitted to the communication terminal 4 in accordance with the request from the communication terminal 4.

3. Third Embodiment

The third embodiment relates to a mobile communication network in which the first and second embodiments are combined.

A. Constitution of Third Embodiment

Figure 10:
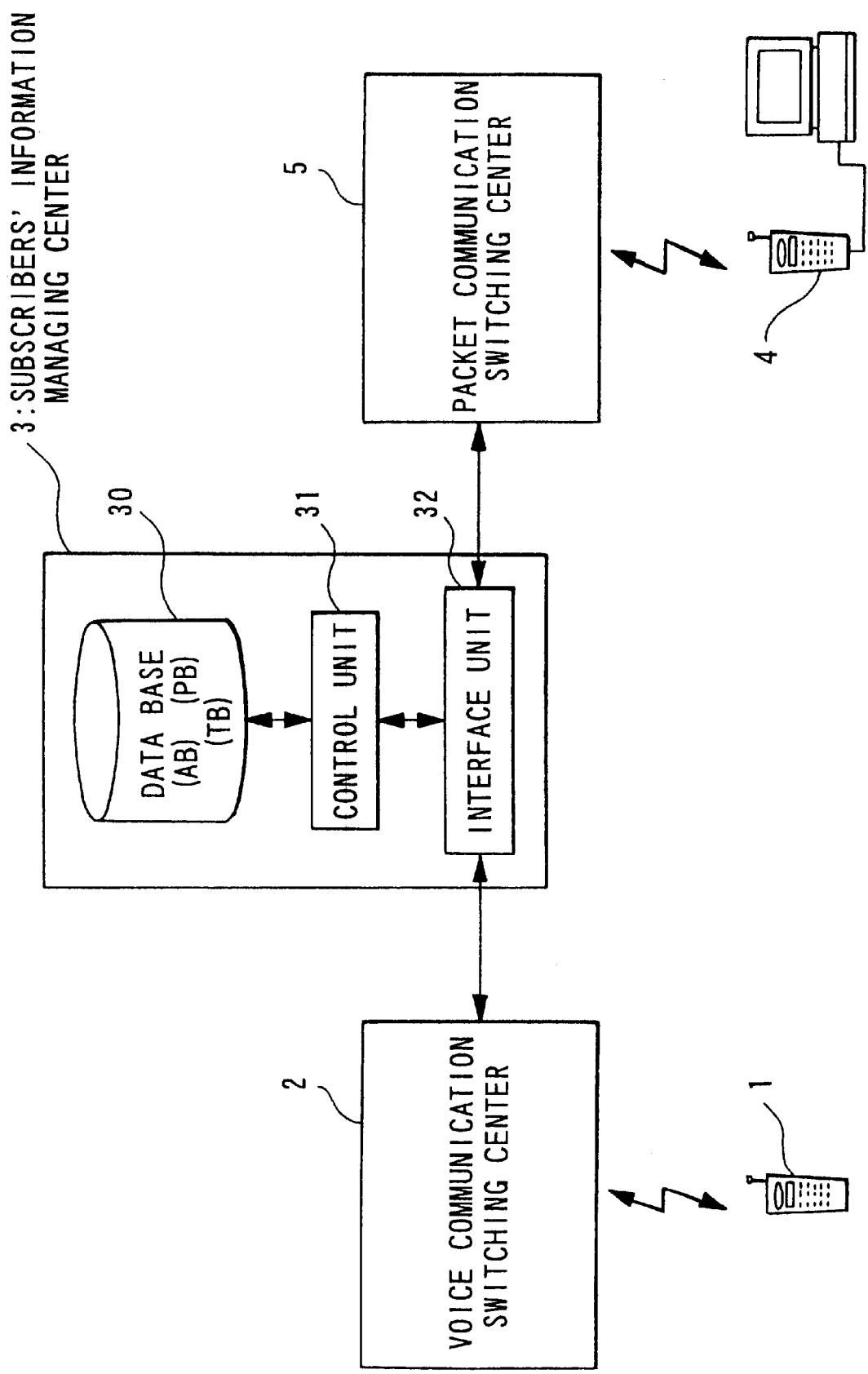
FIG. 10 is a block diagram of a communication network, in which communication messages can be transmitted by multiple communication methods, according to the third embodiment of the present invention.

A mobile communication network according to this third embodiment is shown in FIG. 10. Like component parts of FIG. 1 are denoted by like reference numerals and description thereof is omitted. In the above-mentioned first and second embodiments, the data base 30 is connected to the voice communication switching center 2 and the packet communication switching center 5 (see FIG. 1). More specifically, the data base 30 is installed in a measuring device 3 as shown in FIG. 10. In this case, the measuring device 3 includes a control unit 31 and an interface unit 32. The control unit 31 controls the write and read of information with respect to the data base 30, whereas the interface unit 32 exchanges information with the voice communication switching center 2 and the packet communication switching center 5.

Figure 11:
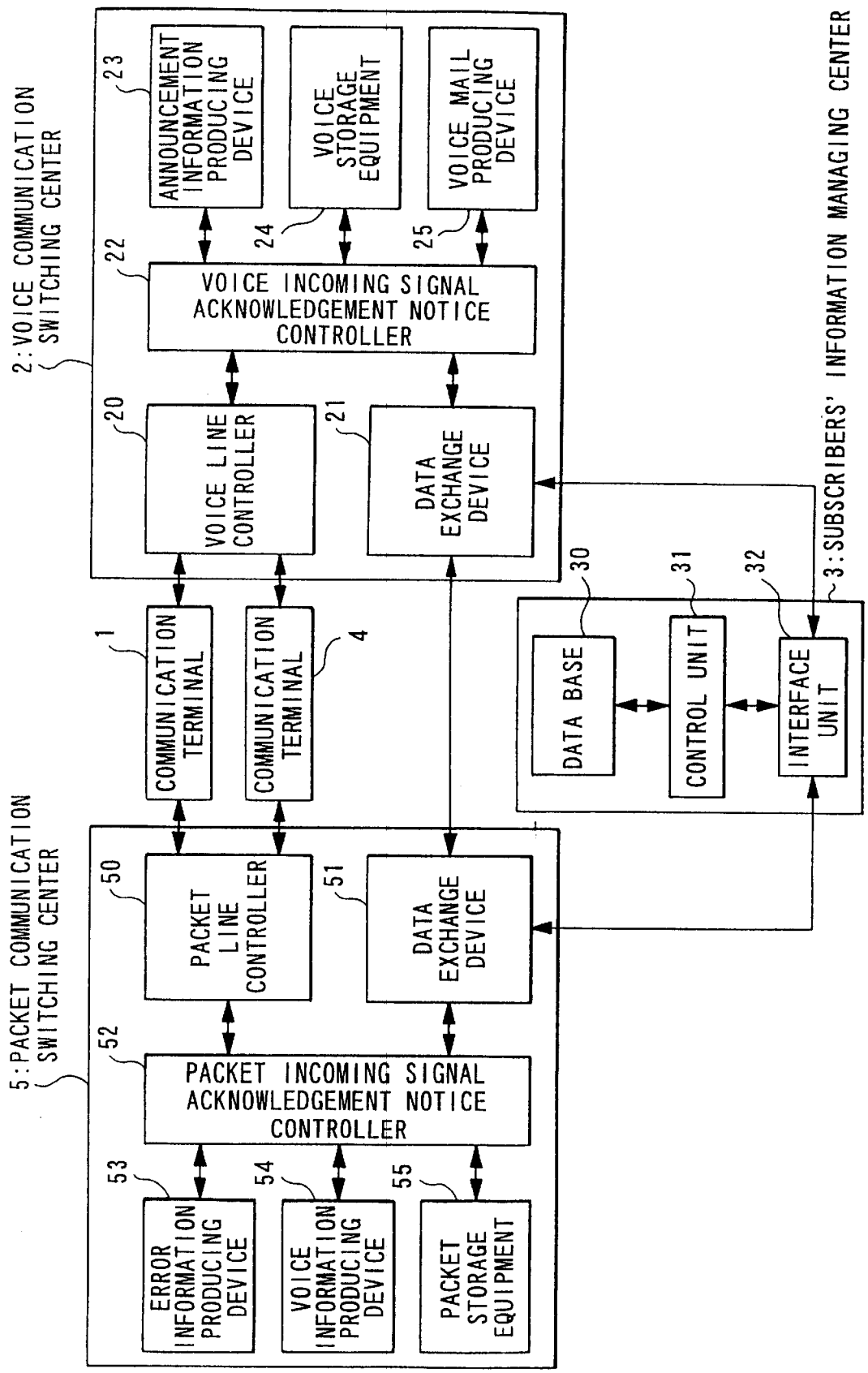
FIG. 11 is a block diagram of a communication switching system according to the third embodiment.

Detailed constitutions of the voice communication switching center 2 and the packet communication switching center 5 according to the third embodiment are shown in FIG. 11. Like component parts of FIGS. 3, 6 and 10 are denoted by like reference numerals and description thereof is omitted. Reference 53 denotes an error information producing device 53, in which an error massage suitable for the packet communication method is produced. Reference numeral 54 denotes a voice information producing device in which a voice information indicating that a packet communication request is made is produced. Reference numeral 55 denotes a packet storage equipment in which packet data from the communication terminal are appropriately stored. The error information producing device 53, the voice information producing device 54 and the packet storage equipment 55 are all connected to the packet incoming signal acknowledgement notice controller 52 and execute correct procedures under the control of the packet incoming signal acknowledgement notice controller 52, in case a regulating procedure for a simultaneous communication is required.

B. Operation of Third Embodiment

B-1: Operation in Case Voice Incoming Signal is Made

Figure 12:
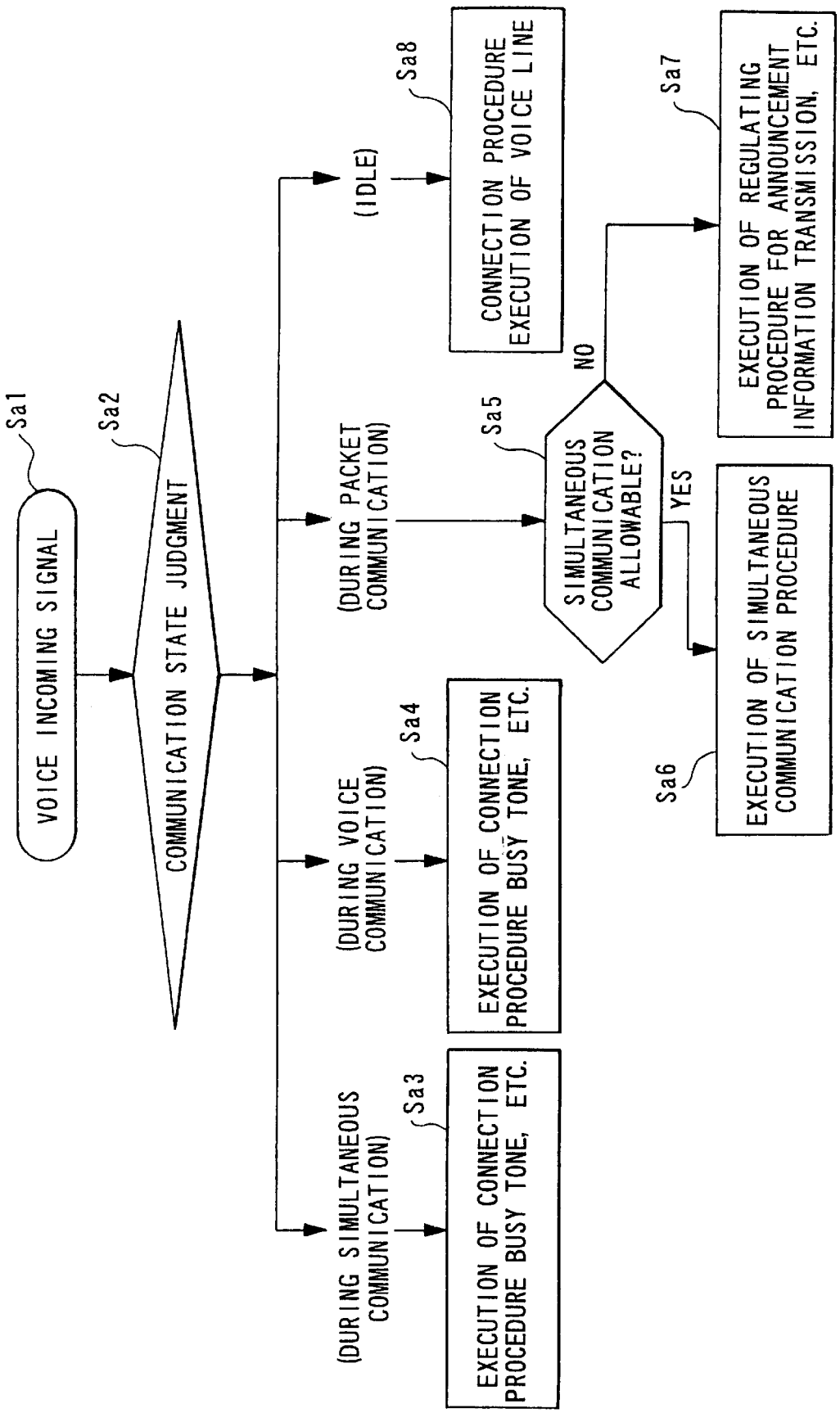
FIG. 12 is a flow chart showing operation for receiving an incoming voice communication according to the third embodiment.

Operation in case a voice incoming signal is made will now be described with reference to FIG. 12. In this case, the communication terminal 1 makes a communication request through the voice communication method. A communication request is made with respect to the voice communication switching center 2 first, and a voice incoming is generated at the voice line controller 20 (Step Sa1).

Here, in case the other party to whom the communication request of the communication terminal 1 is made is the communication terminal 4, a judgment of a communication state of the communication terminal 4 is made (Step Sa2). In this procedure, a communication terminal state request is made with respect to the data switching device 21 from the voice line controller 20. When this request is transmitted to the control unit 31 through an interface unit 32 of a subscriber's information managing center 3, the control unit 31 reads the voice and packet line memories AB, PB and the terminal information TB relating to the communication terminal 4 from the data base 30 and transmits the same to the voice line controller 20 but in a reversed way. The voice line controller 20 makes a judgment of the state of the communication terminal 4 with reference to the voice and packet line memories AB,PB and the terminal information TB.

First, if both the voice and packet line memories AB, PB are "0", the communication terminal 4 is currently busy with a simultaneous communication with the voice communication and the packet communication. In this case, the process proceeds to Step Sa3 where the connecting procedure of busy tone is made with respect to the communication terminal 1. In this case, busy tone is transmitted from the voice line controller 20 to the communication terminal 1.

Then, if the voice line memory AB of the communication terminal 4 is "0" indicating that the terminal 4 is currently busy with a voice communication and the packet line memory PB is "1" indicating that the communication terminal 4 is idle with a packet communication, the process proceeds to Step Sa4 where the connecting procedure of the busy tone, etc. is executed with respect to the communication terminal 1. In this case, the transmission of the busy tone is the same as Step Sa3.

If the packet line memory PB of the communication terminal 4 is "0" indicating that the communication terminal 4 is currently busy with a packet communication and the voice line memory AB is "1" indicating that the communication terminal 4 is idle with a voice communication, the process proceeds to Step Sa5 where a judgment is made as to whether or not a simultaneous communication can be made based on the terminal information TB of the communication terminal 4. If the terminal information TB indicates that a simultaneous communication can be made, the judgment is made "YES" and the process proceeds to Step Sa6 where the simultaneous communication procedure is executed. In this case, the voice communication switching center 2 pages the communication terminal 4, and a voice communication is performed between the communication terminal 1 and the communication terminal 4. In contrast, if the terminal information TB indicates that a simultaneous communication cannot be made, the judgment is made "NO" and the process proceeds to Step Sa7 where the various regulating procedures such as transmission of an announcement information, transmission of an stored voice, transmission of a voice mail and the like are executed under the control of the voice incoming signal acknowledgement notice controller 22 as in the case with the first and second embodiments.

If both the voice and packet line memories AB,PB of the communication terminal 4 are "1" indicating that the communication terminal 4 is currently empty, the process proceeds to Step Sa8 where the connecting procedure of the voice circuits is executed. In this case, the voice communication switching center 2 pages the communication terminal 4, and a communication circuit is connected between the communication terminal 4 and the communication terminal 1.

In this way, when a voice incoming signal is received, a judgment is made with respect to the state of the communication terminal of the other party (i.e., the terminal to which an incoming call was made) based on the voice line memories AB, packet line memories PB and the terminal information TB relating to this communication terminal. Thereafter any procedure is executed based a result of this judgment, a competition occurrable between different communication methods can appropriately be regulated and controlled.

B-2: Operation in Case Packet Incoming Signal is Made

Figure 13:
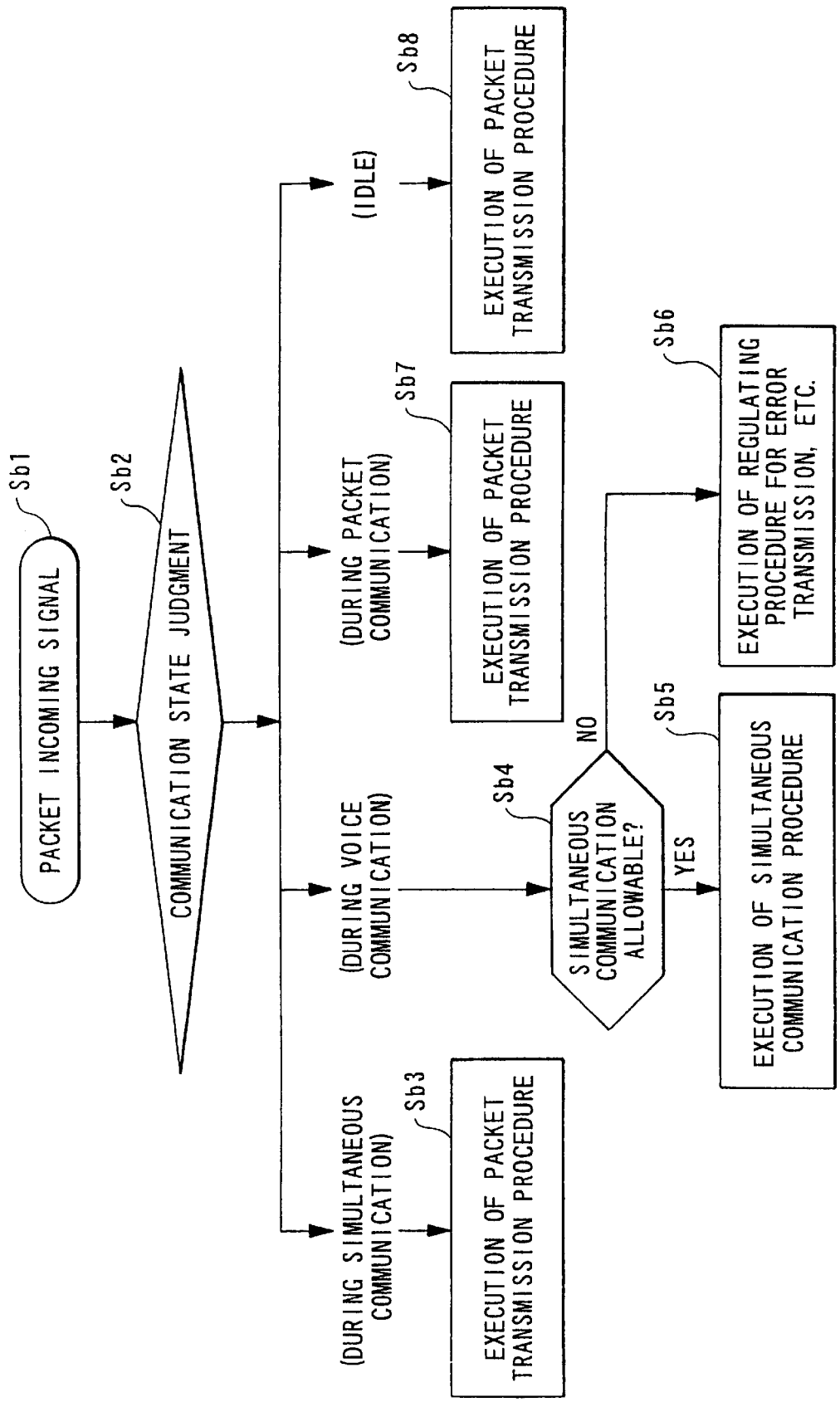
FIG. 13 is a flow chart showing operation of for receiving an incoming packet communication according to the third embodiment.

Operation in case a packet incoming signal is made will now be described with reference to FIG. 13. In this case, the communication terminal 1 makes a communication request through the packet communication method. First, a communication request is made with respect to the packet communication switching center 5, and a packet incoming signal is generated at the packet line controller 50 (Step Sb1).

Here, if the other party to which the communication terminal 1 has made a communication request is the communication terminal 4, a communication terminal state judgment is made with respect to the communication terminal 4 (Step Sb2). In this procedure, a communication terminal state request is made with respect to the data exchange device 51 from the packet line controller 50. When this request is transmitted to the control unit 31 through the interface unit 32 of the subscriber's information managing center 3, the control unit 31 reads the voice and packet line memories AB, PB and the terminal information TB relating to the communication terminal 4 from the data base 30 and transmits those data, i.e., line memories, etc., to the packet line controller 50 through the opposite steps of procedures. Then, the packet line controller 50 makes a judgment on the state of the communication terminal 4 based on the voice and packet line memories AB, PB and the terminal information TB.

First, if both the voice and packet line memories AB,PB of the voice of the communication terminal 4 are "0", the communication terminal 4 is currently busy with a simultaneous communication between the voice communication and the packet communication. A packet communication can be made with multiple communication terminals during the time a packet communication is undergoing. In this case, the process proceeds to Step Sb3 where the packet transmission procedure is executed with respect to the communication terminal 4.

If the voice line memory AB of the communication terminal 4 is "0" indicating that the communication terminal 4 is currently busy with a voice communication and the packet line memory PB is "1" indicating that the communication terminal 4 is currently idle with a communication, the process proceeds to Step Sb4 where a judgment is made as to whether or not a simultaneous communication can be made based on the terminal information TB of the communication terminal 4. If the terminal information TB indicates that a simultaneous communication can be made, the judgment is made "YES", and the process proceeds to Step Sb5 where the simultaneous communication procedure is executed. In this case, the packet communication switching center 5 pages the communication terminal 4, and a packet communication is performed between the communication terminal 1 and the communication terminal 4.

In contrast, if the terminal information TB indicates that a simultaneous communication cannot be made, the judgment is made "NO" and the process proceeds to Step Sb6 where the various regulating procedures such as error return and the like are executed under the control of the packet incoming signal acknowledgement notice controller 52. The various regulating procedures include the followings.

An error message generated at the error information producing device 53 is transmitted through the packet line controller 50 to the communication terminal 1 which has made a communication request through the packet communication method. This error message is data indicating that the communication terminal 4 is currently busy and therefore cannot receive a communication. This error message is transmitted by the packet communication method. By this, the user of the communication terminal 1 can know that a packet communication cannot be made currently.

With respect to the communication terminal 4 which is currently busy by the voice communication method, a voice information generated at the voice information producing device 54 is transmitted to the voice communication switching center 2 via the data exchange devices 51, 21, and this voice information is further transmitted to the communication terminal 4 through the voice line controller 20 by the voice communication method. This voice information is an analog signal and indicates that a packet communication request is made by the communication terminal 1. Accordingly, the user of the communication terminal 4 can rapidly shift to the packet communication with the communication terminal 1 as soon as the voice communication is finished.

The packet data from the communication terminal 1 may be stored in the packet storage equipment 55. In that case, when a regulating procedure request is notified to the packet incoming signal acknowledgement notice controller 52 from the packet line controller 50, the packet incoming signal acknowledgement notice controller 52, in turn, notifies a packet storage request to the packet storage equipment 55. Upon receipt of this request, the packet storage equipment 55 stores packet data from the communication terminal 1. When the packet incoming signal acknowledgement notice controller 52 makes a voice information production request with respect to the voice information producing device 54, a voice information informing that the packet data have been stored is produced. Thereafter, the voice information is transmitted to the voice communication switching center 2 through the data exchange devices 51, 21 and further to the communication terminal 4 through the voice line controller 20. When a packet data reproduction request is made with respect to the packet communication switching center 5 by the communication terminal 4 after the voice communication of the communication terminal 4 is finished, packet data are read from the packet storage equipment 55, and the packet data are then transmitted to the communication terminal 4. By this, it becomes possible even for such a terminal with which the communication terminal 4 cannot make a simultaneous communication to assuredly receive the packet data.

Next, if the packet line memory PB of the communication terminal 4 is "0" indicating that the communication terminal 4 is currently busy with a packet communication and the voice line memory AB is "1" indicating that the communication terminal 4 is not currently busy, the process proceeds, as in the case with the Step Sb5, to Step Sb7 where the packet transmission procedure is executed with respect to the communication terminal 1.

If both the voice and packet line memories AB, PB of the voice of the communication terminal 4 are "1" indicating "empty", the process proceeds to Step Sb8 where the procedure for connecting the packet circuit. In this case, the packet communiction switching center 5 pages the communication terminal 4, and a communication circuit is connected between the communication terminal 4 and the communication terminal 1.

In this way, when a packet incoming signal is received, a judgment is also made, as in the case where a voice incoming signal was received, with respect to the state of the communication terminal of the other party (i.e., the communication terminal to which a communication call was made) based on 1, the voice and packet line memories AB, PB and 2, the terminal information TB relating to this communication terminal. Thereafter any procedure is executed based a result of this judgment, a competition occurrable between different communication methods can appropriately be regulated.

4. Modified Embodiment

The present invention should not be limited to the above-mentioned embodiments. Various modifications can be made, for example, as follows.

In the above-mentioned embodiments, a mobile station, in which a communication is performed by radio, is employed as one example of the communication terminal. It goes without saying, however, that the present invention is likewise applicable to a communication terminal which is used in multiple communication methods by wire.

In the above-mentioned embodiments, a voice communication method and a packet communication method are taken up as one example of the communication method. However, since the present invention is intended to regulate the competition between different communication methods, the communication methods employable in this invention are, of course, not limited in type and form, as well as in number. For example, the present invention can be applied to a communication between communication methods in which different frequency bands are used, between communication methods in which a communication is performed by wire, or between a PHS type communication method and other mobile communication method. The terms "incoming call" is generally used as an incoming signal by a voice communication method. However, in this specification, it is used to refer to an incoming signal by any optional communication method such as a packet communication method or the like.

In the above-mentioned embodiments, the description was made such that the communication terminals 1 and 4 correspond to the voice communication method and the packet communication method. However, all the communication terminals are, of course, not necessarily required to correspond to all the communication methods. In such a case, an announcement information to be transmitted to a communication terminal which has made a communication request may be transmitted by a communication method which is allowed to the communication terminal. If it is arranged such that an announcement information is transmitted by a communication method through which the communication request has been made, even in case the communication terminal, which has made the communication request, has a communicatable communication method and an incommunicatable communication method, the switching center can transmit the announcement information without a need of making a judgment as to whether or not a certain communication method is allowed to the communication terminal which has made the communication request. As a consequence, there would be no need to apply any change to the announcement information transmission procedure even if the number of communication methods should be increased in future.

In the above-mentioned embodiment, the announcement information is transmitted in the form of a voice information. Since the announcement information is used for informing that the other party is currently busy, it may be transmitted in the form of the "busy tone". However, it is preferred not to use a similar "busy tone" to that which has been conventionally used, because the use of this tone makes it difficult to determine the type of the communication method which the other party is using. Therefore, a different frequency of the "busy tone" is preferably used depending on the type of a communication method.

In the above-mentioned embodiments, the voice line memory AB and the packet line memory PB are managed in the first bit of the 8-bit storage area. The present invention should not be limited to the 8-bit but it may, of course, be a 1-bit or any plural number-bit. The storage area just mentioned may be obtained by effectively utilizing an extra area of the existing storage area in the data base 30.

5. Effect

As described in the foregoing, according to the present invention, when a communication request is made with respect to one communication terminal from other communication terminal by one communication method, a judgment can be made as to whether or not the communication request should be allowed with reference to a communication line-busy indicative information relevant to the other communication terminal with respect not only to the one communication method but also other communication methods. Accordingly, a simultaneous communication between competing communication methods can appropriately be regulated or controlled. Moreover, it becomes possible for the afore-mentioned other communication terminal to know the fact that the afore-mentioned one communication terminal is currently busy.

Furthermore, the data base for managing therein the communication line-busy indicative information indicating the communication state of the communication terminal can be commonly used by multiple communication methods.

In addition, when an incoming call is made by a different communication method from the afore-mentioned one communication method, the incoming call can be informed to the other party and the communication information by other communication method can be stored. Also, the stored communication information can be transmitted to the communication terminal of the other party in accordance with a request of the other party.

We claim:

1. A communication switching system for controlling communications that are performed through multiple communication methods by connecting and switching communication circuits between individual communication terminals, comprising:

a data base for managing line memories, each of the line memories indicating a communication state of a corresponding communication terminal, and terminal information indicating a capability of the corresponding communication terminal, including whether or not the corresponding communication terminal can perform a simultaneous communication through multiple communication methods;

read means for reading one of said line memories and said terminal information relevant to a first communication terminal from said data base when a communication request is received with respect to said first communication terminal from a second communication terminal through one of the communication methods; and determining means for determining whether or not said first communication terminal is currently busy, for determining which communication method is in use in accordance with said line memory if said first terminal is busy, and for determining whether or not said communication request should be allowed in accordance with said terminal information and the determined communication method.

2. A communication switching system for controlling communications that are performed through multiple communication methods by connecting and switching communication circuits between individual communication terminals, comprising:

a data base for managing line memories, each of the line memories indicating a communication state of a corresponding communication terminal and terminal information indicating a capability of the corresponding communication terminal, including whether or not the corresponding communication terminal can perform a simultaneous communication through multiple communication methods;

read means for reading one of said line memories and said terminal information from said data base when an incoming call is received with respect to a communication terminal; and notice means for notifying said communication terminal that said incoming call is received, through one of said communication methods by which a communication is undergoing, in case said line memory indicates that said communication terminal is currently busy through a communication method different from that through which said incoming call is made and said terminal information indicates that said communication terminal cannot perform a simultaneous communication through multiple communication methods.

3. A communication switching system according to claim 2, further comprising means for connecting said incoming call to said communication terminal upon receipt of instructions for changing the communication from said communication terminal.

4. A communication switching system for controlling communications that are performed through multiple communication methods by connecting and switching communication circuits between individual communication terminals, comprising:

a data base for managing line memories, each of the line memories indicating a communication state of a corresponding communication terminal, and terminal information indicating whether or not said corresponding communication terminal can perform a simultaneous communication through multiple communication methods;

read means for reading one of said line memories and said terminal information from said data base when an incoming call is received with respect to a communication terminal;

storage means for receiving and storing a communication information from said incoming call, in case said line memory indicates that said communication terminal is currently busy through a communication method different from that through which said incoming call is made and said terminal information indicates that said communication terminal cannot perform a simultaneous communication through multiple communication methods;

notice means for notifying said communication terminal to store the communication information; and transmission means for transmitting said communication information stored in said storage means to said communication terminal in accordance with instructions from said communication terminal.

5. A communication switching system for controlling communications that are performed through multiple communication methods by connecting and switching communication circuits between individual communication terminals, comprising:

a data base for managing line memories, each of the line memories indicating a communication state of a corresponding communication terminal, and terminal information indicating whether or not said corresponding communication terminal can perform a simultaneous communication through multiple communication methods;

read means for reading one of said line memories and said terminal information from said data base when an incoming call is received with respect to a communication terminal;

storage means for receiving and storing a communication information from said incoming call, in case said line memory indicates that said communication terminal is currently busy through a communication method different from that through which said incoming call is made and said terminal information indicates that said communication terminal cannot perform a simultaneous communication through multiple communication methods; and transmission means for transmitting said communication information stored in said storage means to said communication terminal through said communication method by which a communication is undergoing.

6. A communication switching system for controlling communications that are performed through multiple communication methods by connecting and switching communication circuits between individual communication terminals, comprising:

a data base for managing line memories, each of the line memories indicating a communication state of a corresponding communication terminal, and terminal information indicating a capability of said corresponding communication terminal, including whether or not said corresponding communication terminal can perform a simultaneous communication through multiple communication methods;

read means for reading one of said line memories and said terminal information from said data base when an incoming call is received with respect to a communication terminal; and notice means for notifying said communication terminal, in order to perform a simultaneous communication, that an incoming call is received with respect to said communication terminal, in case said line memory indicates that said communication terminal is currently busy through a communication method different from that through which said incoming call is received and said terminal information indicates that said communication terminal can perform a simultaneous communication through multiple communication methods.

7. A communication switching system according to one of claims 1 or 2 through 6, wherein said multiple communication methods include a voice communication method and a packet communication method.

8. A communication switching system for controlling communications performed through a voice communication method and a packet communication method by connecting and switching communication circuits between individual communication terminals, comprising:

a data base for managing line memories, each of the line memories indicating a communication state of a corresponding communication terminal, and terminal information indicating whether or not said corresponding communication terminal can perform a simultaneous communication through said voice communication method and said packet communication method;

read means for reading one of said line memories corresponding to a communication terminal and said terminal information from said data base when an incoming call is received with respect to said communication terminal;

voice storage means for receiving and storing a communication information from said incoming call, in case said line memory indicates that said communication terminal is currently busy through said packet communication method and said terminal information indicates that said communication terminal cannot perform a simultaneous communication between said voice communication method and said packet communication method when said incoming call thus received is transmitted through said voice communication method;

notice means for notifying said communication terminal that said communication information is stored in said voice storage means; and transmission means for transmitting said communication information stored in said voice storage means in accordance with instructions from said communication terminal.

9. A communication switching system for controlling communications performed through a voice communication method and a packet communication method by connecting and switching communication circuits between individual communication terminals, comprising:

a data base for managing line memories, each of the line memories indicating a communication state of a corresponding communication terminal, and terminal information indicating whether or not said corresponding communication terminal can perform a simultaneous communication through said voice communication method and said packet communication method;

read means for reading one of said line memories corresponding to a communication terminal and said terminal information from said data base when an incoming call is received with respect to said communication terminal;

packet storage means for receiving and storing a communication information from said incoming call, in case said line memory indicates that said communication terminal is currently busy through said voice communication method and said terminal information indicates that said communication terminal cannot perform a simultaneous communication between said voice communication method and said packet communication method when said incoming call is received through said packet communication method;

notice means for notifying said communication terminal that said communication information is stored in said packet storage means; and transmission means for transmitting said communication information stored in said packet storage means in accordance with instructions from said communication terminal.

10. A communication switching system for controlling communications performed through a voice communication method and a packet communication method by connecting and switching communication circuits between individual communication terminals, comprising:

a data base for managing line memories, each of the line memories indicating a communication state of a corresponding communication terminal, and terminal information indicating whether or not said corresponding communication terminal can perform a simultaneous communication through said voice communication method and said packet communication method;

read means for reading one of said line memories corresponding to a communication terminal and said terminal information from said data base when an incoming call is received with respect to said communication terminal;

storage means for receiving and storing a voice communication information from said incoming call, in case said line memory indicates that said communication terminal is currently busy through said packet communication method, which is different from said voice communication method and said terminal information indicates that said communication terminal cannot perform a simultaneous communication through said voice communication method and said packet communication method; and transmission means for transmitting said voice communication information stored in said storage means through said packet communication method.

11. A communication switching system for controlling communications performed through a voice communication method and a packet communication method by connecting and switching communication circuits between individual communication terminals, comprising:

a data base for managing line memories, each of the line memories indicating a communication state of a corresponding communication terminal, and terminal information indicating a capability of said corresponding communication terminal, including whether or not said corresponding communication terminal can perform a simultaneous communication through said voice communication method and said packet communication method;

read means for reading one of said line memories corresponding to a communication terminal and said terminal information from said data base when an incoming call is received with respect to said communication terminal; and notice means for notifying the communication terminal, in order to perform a simultaneous communication, that an incoming call is received with respect to said communication terminal, in case said line memory indicates that said communication terminal is currently busy through a communication method different from that through which said incoming call is made and said terminal information indicates that said communication terminal can perform a simultaneous communication through said voice communication method and said packet communication method.

12. A communication switching system according to one of claims 1 or 8 through 11, wherein said communication switching system comprises multiple switching centers corresponding to communication methods through which communications are performed between said communication terminals, and a subscribers' information managing center for performing communication with said switching centers, said subscribers' information managing center comprising:

said data base;

a control unit for reading and writing information with respect to said data base; and an interface unit for performing a communication between said control unit and each of said switching centers.

13. A communication switching method for controlling communications that are performed through multiple communication methods by connecting and switching communication circuits between individual communication terminals using terminal information, comprising the steps of:

detecting individual communication states of the communication terminals;

writing line memories, each of said line memories indicating a communication state of a corresponding communication terminal and including the terminal information indicating whether or not the corresponding communication terminal can perform a simultaneous communication;

reading one of said line memories and said terminal information when an incoming call is made with respect to a communication terminal;

storing a communication information from said incoming call in a storage means, in case line memory indicates that said communication terminal is currently busy through a communication method different from that through which said incoming call is received and said terminal information indicates that said communication terminal cannot perform a simultaneous communication through multiple communication methods;

notifying said communication terminal to store the communication information; and transmitting said communication information stored in said storage means to said communication terminal in accordance with instruction from said communication terminal.

14. A communication switching method for controlling communications that are performed through multiple communication methods by connecting and switching communication circuits between individual communication terminals using terminal information, comprising the steps of:

- detecting individual communication states of the communication terminals;
- writing line memories, each of said line memories indicating a communication state of a corresponding communication terminal and including the terminal information indicating whether or not the corresponding communication terminal can perform a simultaneous communication;
- reading one of said line memories and said terminal information when an incoming call is made with respect to a communication terminal;
- storing a communication information from said incoming call in a storage means, in case said line memory indicates that said communication terminal is currently busy through a communication method different from that through which said incoming call is received and said terminal information indicates that said communication terminal cannot perform a simultaneous communication through multiple communication methods; and
- transmitting said communication information stored in said storage means to said first communication terminal through said communication method by which a communication is undergoing.

15. A communication switching method for controlling communications that are performed through multiple communication methods by connecting and switching communication circuits between individual communication terminals using terminal information, comprising the steps of:

- detecting individual communication states of the communication terminals;
- writing line memories, each of said line memories indicating a communication state of a corresponding communication terminal and including the terminal information indicating a capability of the corresponding communication terminal, including whether or not the corresponding communication terminal can perform a simultaneous communication through multiple communication methods;
- reading one of said line memories and said terminal information when an incoming call is made with respect to a communication terminal; and
- notifying said communication terminal, in order to perform a simultaneous communication, that an incoming call is received with respect to said communication terminal, in case said line memory indicates that said communication terminal is currently busy through a communication method different from that through which said incoming call is received and said terminal information indicates that said communication terminal can perform a simultaneous communication through multiple communication methods.

16. A communication switching method for controlling communication performed through a voice communication methods and a packet communication method by connecting and switching communication circuits between individual communication terminals using terminal information, comprising the steps of:

- detecting individual communication states of the communication terminals;
- writing line memories, each of said line memories indicating a communication state of a corresponding communication terminal and including the terminal information indicating a capability of the corresponding communication terminal, including whether or not the corresponding communication terminal can perform a simultaneous communication through multiple communication methods;
- reading one of said line memories corresponding to a communication terminal and said terminal information when an incoming call is made with respect to said communication terminal; and
- notifying said communication terminal, through said packet communication method, that an incoming call is received with respect to said communication terminal, in case said line memory indicates that said communication terminal is currently busy through said packet communication method and said terminal information indicates that said communication terminal cannot perform a simultaneous communication between said voice communication method and said packet communication method when said incoming call is received through said voice communication method.

17. A communication switching method for controlling communications performed through a voice communication methods and a packet communication method by connecting and switching communication circuits between individual communication terminals using terminal information, comprising the steps of:

- detecting individual communication states of the communication terminals;
- writing line memories, each of said line memories indicating a communication state of a corresponding communication terminal and including the terminal information indicating a capability of the corresponding communication terminal, including whether or not the corresponding communication terminal can perform a simultaneous communication through multiple communication methods;
- reading one of said line memories corresponding to a communication terminal and said terminal information when an incoming call is made with respect to said communication terminal; and
- notifying said communication terminal, through said voice communication method, that an incoming call is received with respect to said communication terminal, in case said line memory indicates that said communication terminal is currently busy through said voice communication method and said terminal information indicates that said communication terminal cannot perform a simultaneous communication between said voice communication method and said packet communication method when said incoming call is received through said packet communication method.

18. A communication switching method for controlling communication performed through a voice communication method and a packet communication method by connecting and switching communication circuits between individual communication terminals using terminal information, comprising the steps of:

- detecting individual communication states of the communication terminals;
- writing line memories, each of said line memories indicating a communication state of a corresponding communication terminal and including the terminal information indicating whether or not the corresponding communication terminal can perform a simultaneous communication through said voice communication method and said packet communication method;

reading one of said line memories corresponding to a communication terminal and said terminal information when an incoming call is made with respect to said communication terminal;

storing a communication information from said incoming call, in case said line memory indicates that said communication terminal is currently busy through said packet communication method and said terminal information indicates that said communication terminal cannot perform a simultaneous communication between said voice communication method and said packet communication method when said incoming call is received through said voice communication method;

notifying said communication terminal that said communication information is stored; and transmitting stored said communication information in accordance with instructions from said first communication terminal.

19. A communication switching method for controlling communications performed through a voice communication method and a packet communication method by connecting and switching communication circuits between individual communication terminals using terminal information, comprising the steps of:

detecting individual communication states of the communication terminals;

writing line memories, each of said line memories indicating a communication state of a corresponding communication terminal and including the terminal information indicating whether or not the corresponding communication terminal can perform a simultaneous communication through said voice communication method and said packet communication method;

reading one of said line memories corresponding to a communication terminal and said terminal information when an incoming call is made with respect to said communication terminal;

storing a communication information from said incoming call, in case said line memory indicates that said communication terminal is currently busy through said voice communication method and said terminal information indicates that said communication terminal cannot perform a simultaneous communication between said voice communication method and said packet communication method when said incoming call is received through said packet communication method;

notifying said communication terminal that said communication information is stored; and transmitting stored said communication information in accordance with instructions from said communication terminal.

20. A communication switching method for controlling communication performed through a voice communication method and a packet communication method by connecting and switching communication circuits between individual communication terminals using terminal information, comprising the steps of:

detecting individual communication states of the communication terminals;

writing line memories, each of said line memories indicating a communication state of a corresponding communication terminal and including the terminal information indicating whether or not the corresponding communication terminal can perform a simultaneous communication through said voice communication method and said packet communication method;

reading one of said line memories corresponding to a communication terminal and said terminal information when an incoming call is made with respect to said communication terminal;

storing a voice communication information from said incoming call, in case said line memory indicates that said communication terminal is currently busy through said packet communication method, which is different from said voice communication method and said terminal information indicates that said communication terminal cannot perform a simultaneous communication through said voice communication method and said packet communication method; and transmitting stored said voice communication information through said packet communication method.

21. A communication switching system for controlling communications that are performed through multiple communication methods by connecting and switching communication circuits between individual communication terminals, comprising:

at least one memory, the at least one memory including data indicating a communication state of each of the communication terminals, and terminal information indicating a capability of each of the communication terminals, including whether each of the communication terminals can perform a simultaneous communication through multiple communication methods; and a processor coupled to the at least one memory, the processor programmed to:

read the terminal information from the at least one memory relevant to a first communication terminal when a communication request is made with respect to said first communication terminal from a second communication terminal through one of the communication methods, and determine whether the first communication terminal is busy, which communication method is in use in accordance with the communication state data if the first terminal is busy, and whether the communication request should be allowed in accordance with the terminal information and the determined communication method.

22. A communication switching system for controlling communications that are performed through multiple communication methods by connecting and switching communication circuits between individual communication terminals, comprising:

at least one memory, the at least one memory including data indicating a communication state of each of the communication terminals, and terminal information indicating a capability of each of the communication terminals, including whether each of the communication terminals can perform a simultaneous communication through multiple communication methods; and a processor coupled to the at least one memory, the processor programmed to:

read the terminal information from a first location in the at least one memory when an incoming call is received with respect to a first communication terminal, and notify the first communication terminal that the incoming call is received, through the communication method by which a communication is undergoing, where the first location in the at least one memory indicates that the first communication terminal is currently busy through a communication method different from that by which said incoming call is received and the terminal information indicates that the first communication terminal cannot perform a simultaneous communication through multiple communication methods.

23. A communication switching system for controlling communications that are performed through multiple communication methods by connecting and switching communication circuits between individual communication terminals, comprising:

at least one memory, the at least one memory including data indicating a communication state of each of the communication terminals, and terminal information indicating whether each of the communication terminals can perform a simultaneous communication through multiple communication methods;

a processor coupled to the at least one memory, the processor programmed to:
      read the terminal information from a first location in the at least one memory when an incoming call is made with respect to the first communication terminal, and
      notify the first communication terminal to store communication information from the incoming call;

a storage device coupled to the processor, the storage device receiving and storing the communication information from the incoming call, where the communication state data indicates that the first communication terminal is busy through a communication method different from that through which the incoming call is made and the terminal information indicates that the first communication terminal cannot perform a simultaneous communication through multiple communication methods; and a transmitter coupled to the storage device and the first communication terminal, the transmitter transmitting the communication information stored in the storage device to the first communication terminal in accordance with instructions from the first communication terminal.

24. A communication switching system for controlling communications that are performed through multiple communication methods by connecting and switching communication circuits between individual communication terminals, comprising:

at least one memory, the at least one memory including data indicating a communication state of each of the communication terminals, and terminal information indicating whether each of the communication terminals can perform a simultaneous communication through multiple communication methods;

a processor coupled to the at least one memory, the processor programmed to:
      read the terminal information from a first location in the at least one memory when an incoming call is made with respect to the first communication terminal;

a storage device coupled to the processor, the storage device receiving and storing the communication information from the incoming call, where the communication state data indicates that the first communication terminal is busy through a communication method different from that through which the incoming call is made and the terminal information indicates that the first communication terminal cannot perform a simultaneous communication through multiple communication methods; and a transmitter coupled to the storage device and the first communication terminal, the transmitter transmitting the communication information stored in the storage device to the first communication terminal through a communication method by which the first communication terminal is communicating.

25. A communication switching system for controlling communications that are performed through multiple communication methods by connecting and switching communication circuits between individual communication terminals, comprising:

at least one memory, the at least one memory including data indicating a communication state of each of the communication terminals, and terminal information indicating a capability of each of the communication terminals, including whether each of the communication terminals can perform a simultaneous communication through multiple communication methods; and a processor coupled to the at least one memory, the processor programmed to:
      read the terminal information from a first location in the at least one memory when an incoming call is received with respect to the first communication terminal, and
      notify the first communication terminal, in order to perform a simultaneous communication, that the incoming call is received with respect to the first communication terminal, where the first location in the at least one memory indicates that the first communication terminal is currently busy through a communication method different from that by which the incoming call is received and the terminal information indicates that the first communication terminal can perform a simultaneous communication through multiple communication methods.

* * * * *

UNITED STATES PATENT AND TRADEMARK OFFICE
CERTIFICATE OF CORRECTION

PATENT NO. : 5,974,044
DATED : October 26, 1999
INVENTOR(S) : Kimio Ikeda et al.

It is certified that error appears in the above-identified patent and that said Letters Patent is hereby corrected as shown below:

On the Title Page

In column 1, item [73] please change "Mobile Communications Network Inc.," to --NTT Mobile Communications Network Inc.--

In the Claims

In claim 16, line 3, please change "methods" to --method--.

In claim 17, line 3, please change "methods" to --method--.

Signed and Sealed this

Nineteenth Day of December, 2000

Q. TODD DICKINSON

Attest:

*Attesting Officer*            *Commissioner of Patents and Trademarks*